United States Patent
Nakayama et al.

(10) Patent No.: US 10,347,914 B2
(45) Date of Patent: *Jul. 9, 2019

(54) POSITIVE ELECTRODE ACTIVE MATERIAL FOR NON-AQUEOUS ELECTROLYTE SECONDARY BATTERY, PROCESS FOR PRODUCING THE POSITIVE ELECTRODE ACTIVE MATERIAL FOR NON-AQUEOUS ELECTROLYTE SECONDARY BATTERY, AND NON-AQUEOUS ELECTROLYTE SECONDARY BATTERY USING THE POSITIVE ELECTRODE ACTIVE MATERIAL FOR NON-AQUEOUS ELECTROLYTE SECONDARY BATTERY

(71) Applicant: SUMITOMO METAL MINING CO., LTD., Tokyo (JP)

(72) Inventors: Tomoko Nakayama, Niihama (JP); Masanori Takagi, Niihama (JP); Kensaku Mori, Niihama (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/029,855

(22) Filed: Jul. 9, 2018

(65) Prior Publication Data
US 2018/0316010 A1 Nov. 1, 2018

Related U.S. Application Data

(62) Division of application No. 14/901,731, filed as application No. PCT/JP2014/066519 on Jun. 23, 2014, now Pat. No. 10,050,267.

(30) Foreign Application Priority Data

Jul. 17, 2013 (JP) .................................. 2013-148151

(51) Int. Cl.
| | | |
|---|---|---|
| H01M 4/50 | (2010.01) | |
| H01M 4/525 | (2010.01) | |
| H01M 4/505 | (2010.01) | |
| C01G 53/00 | (2006.01) | |
| H01M 4/485 | (2010.01) | |
| H01M 4/02 | (2006.01) | |

(52) U.S. Cl.
CPC ............ *H01M 4/525* (2013.01); *C01G 53/42* (2013.01); *C01G 53/50* (2013.01); *H01M 4/485* (2013.01); *H01M 4/505* (2013.01); *C01P 2006/40* (2013.01); *H01M 2004/028* (2013.01)

(58) Field of Classification Search
CPC ....... C01G 53/42; C01G 53/50; H01M 4/505; H01M 4/525; H01M 4/485; H01M 2004/028; C01P 2006/40
USPC .................. 429/223; 252/519.15, 519.12
See application file for complete search history.

(56) References Cited

U.S. PATENT DOCUMENTS

| | | | |
|---|---|---|---|
| 5,955,051 A * | 9/1999 | Li .................. | H01M 4/525 423/594.4 |
| 10,050,267 B2 * | 8/2018 | Nakayama ............. | C01G 53/42 |
| 2002/0192552 A1 | 12/2002 | Lampe-Onnerud et al. | |
| 2011/0305955 A1 | 12/2011 | Song et al. | |
| 2012/0028128 A1 | 2/2012 | Seino et al. | |
| 2013/0015396 A1* | 1/2013 | Terashima ............ | H01M 4/505 252/182.1 |
| 2013/0040202 A1 | 2/2013 | Katusic et al. | |
| 2013/0313471 A1* | 11/2013 | Endo ..................... | C01G 53/50 252/182.1 |
| 2015/0093643 A1* | 4/2015 | Hiratsuka ............. | C01G 53/50 429/221 |
| 2015/0188136 A1 | 7/2015 | Mori et al. | |
| 2015/0221934 A1* | 8/2015 | Hiratsuka ............. | H01M 4/505 429/223 |
| 2015/0357641 A1* | 12/2015 | Sugie .................... | H01M 4/505 429/223 |
| 2016/0013472 A1* | 1/2016 | Mitsumoto .......... | H01M 4/505 429/231.1 |
| 2016/0218362 A1* | 7/2016 | Kagei .................. | H01M 4/505 |

(Continued)

FOREIGN PATENT DOCUMENTS

| | | |
|---|---|---|
| JP | H5-242891 A | 9/1993 |
| JP | 2003-17054 A | 1/2003 |

(Continued)

OTHER PUBLICATIONS

International Search Report for PCT/JP2014/066519, dated Sep. 16, 2014.

*Primary Examiner* — Douglas J McGinty
(74) *Attorney, Agent, or Firm* — Kratz, Quintos & Hanson, LLP

(57) ABSTRACT

The purpose of the present invention is to provide a positive-electrode active material for non-aqueous electrolyte secondary batteries that is capable of achieving both a high capacity and a high output. This positive-electrode active material contains a lithium-nickel composite oxide represented by the general formula: $Li_b Ni_{1-x-y} Co_x M_y O_2$ wherein M represents at least one element selected from Al, Ti, Mn and W, b is $0.95 \leq b \leq 1.03$, x is $0 < x \leq 0.15$, y is $0 < y \leq 0.07$, and x and y is $x+y \leq 0.16$, wherein c-axis length of the lithium-nickel composite oxide is 14.185 angstrom or greater as determined by a Rietveld analysis of X-ray diffraction.

18 Claims, 2 Drawing Sheets

(56) References Cited

U.S. PATENT DOCUMENTS

| | | | |
|---|---|---|---|
| 2016/0254539 A1* | 9/2016 | Kagei | H01M 4/505 |
| | | | 252/182.1 |
| 2017/0012286 A1* | 1/2017 | Washida | H01M 4/505 |
| 2017/0054147 A1 | 2/2017 | Yokoyama et al. | |
| 2017/0117544 A1* | 4/2017 | Endo | C01G 53/50 |
| 2017/0125796 A1* | 5/2017 | Kamiyama | H01M 4/525 |
| 2017/0288215 A1* | 10/2017 | Mitsumoto | H01M 10/0525 |

FOREIGN PATENT DOCUMENTS

| | | |
|---|---|---|
| JP | 2003-68298 A | 3/2003 |
| JP | 2003-317708 A | 11/2003 |
| JP | 2004-127675 A | 4/2004 |
| JP | 2004-531034 A | 10/2004 |
| JP | 2006-278341 A | 10/2006 |
| JP | 2007-273108 A | 10/2007 |
| JP | 2012-4109 A | 1/2012 |
| WO | 2010/107084 A1 | 9/2010 |

\* cited by examiner

[FIG.1]
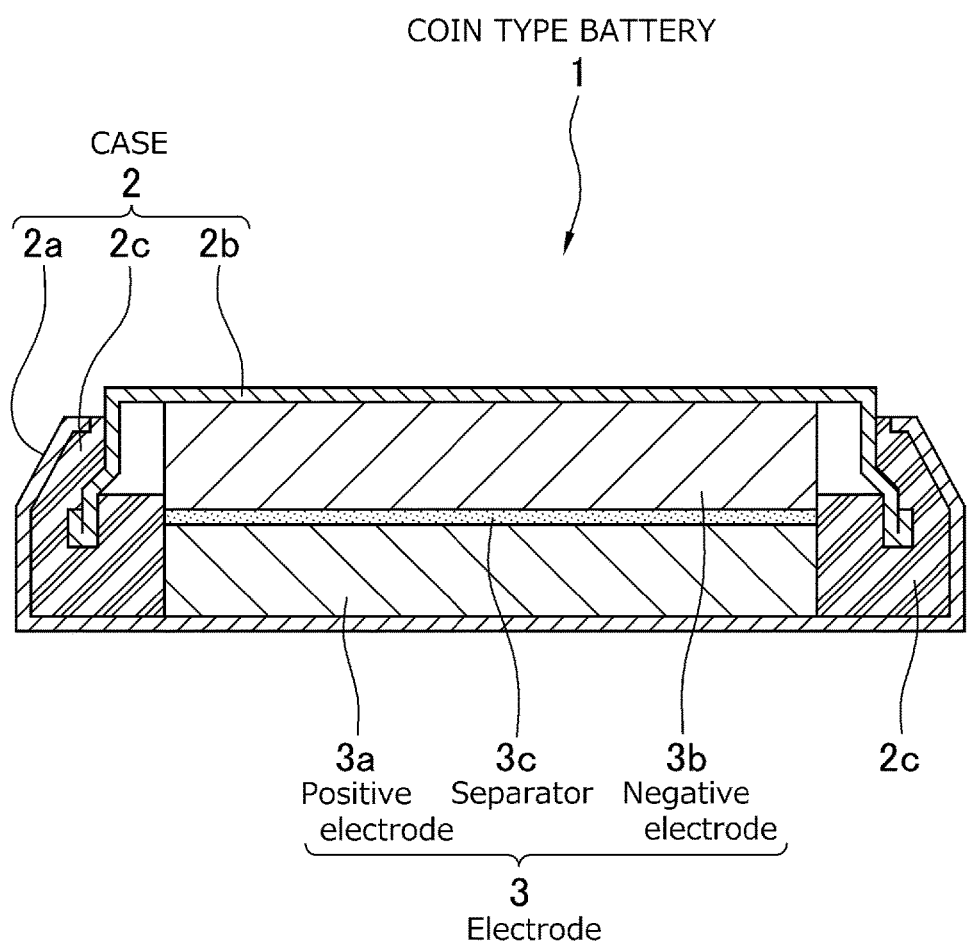

[FIG.2]
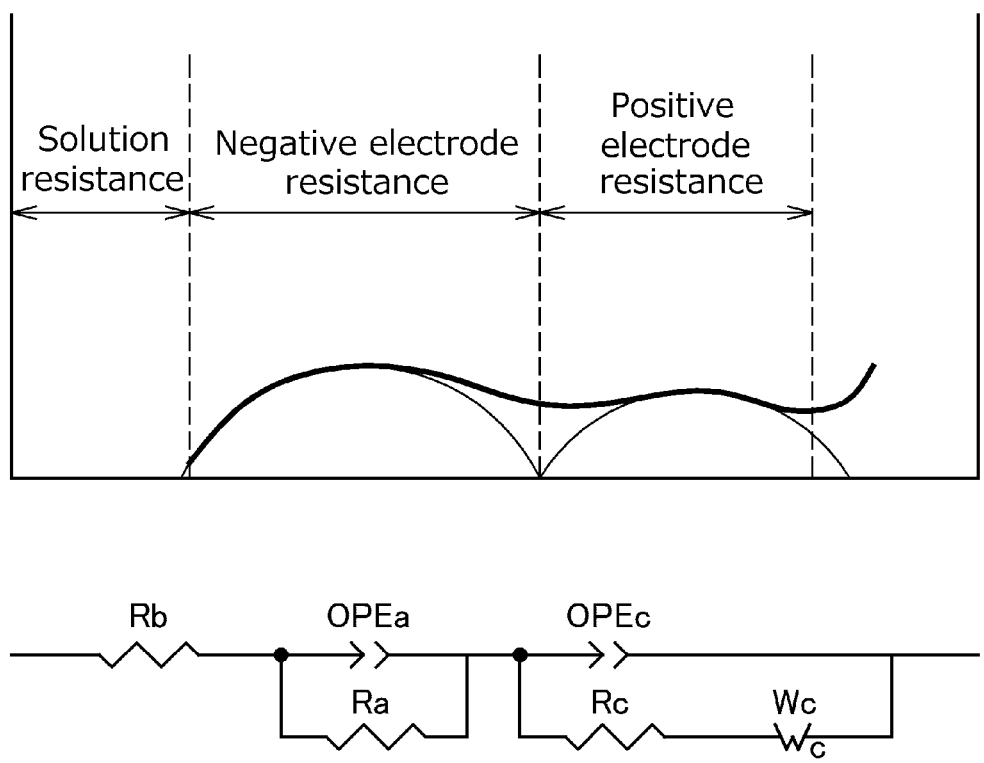

POSITIVE ELECTRODE ACTIVE MATERIAL FOR NON-AQUEOUS ELECTROLYTE SECONDARY BATTERY, PROCESS FOR PRODUCING THE POSITIVE ELECTRODE ACTIVE MATERIAL FOR NON-AQUEOUS ELECTROLYTE SECONDARY BATTERY, AND NON-AQUEOUS ELECTROLYTE SECONDARY BATTERY USING THE POSITIVE ELECTRODE ACTIVE MATERIAL FOR NON-AQUEOUS ELECTROLYTE SECONDARY BATTERY

TECHNICAL FIELD

The present invention relates to a positive electrode active material for a non-aqueous electrolyte secondary battery, a process for producing the positive electrode active material for a non-aqueous electrolyte secondary battery, and a non-aqueous electrolyte secondary battery in which the positive electrode active material for a non-aqueous electrolyte secondary battery is used.

BACKGROUND ART

In recent years, with the rapid spread of a small electronic equipment such as a mobile phone or a notebook-sized personal computer, demand for a non-aqueous electrolyte secondary battery which is used as a chargeable and dischargeable power supply has been rapidly increased. As a positive electrode active material for a non-aqueous electrolyte secondary battery, lithium-nickel composite oxide represented by lithium nickel dioxide ($LiNiO_2$) and lithium-manganese composite oxide represented by lithium manganese dioxide ($LiMnO_2$) have been widely used as well as lithium-cobalt composite oxide represented by lithium cobalt dioxide ($LiCoO_2$).

However, there are some defects in the lithium cobalt dioxide, such that the lithium cobalt dioxide is expensive because its reserve is a little in the earth, and that the lithium cobalt dioxide contains cobalt which is unstable in supply and has a highly fluctuating price range as a major component. Therefore, there have been remarked lithium-nickel composite oxide containing relatively inexpensive nickel as a major component and lithium-manganese composite oxide containing relatively inexpensive manganese as a major component from the viewpoint of reducing in costs. The lithium manganese dioxide is superior in thermal stability to lithium cobalt dioxide. However, the lithium manganese dioxide has some problems in practical use in a battery, because its charge and discharge capacity is much smaller than that of the other materials, and its charge and discharge cycle characteristic showing life of a battery is also much shorter than the other materials. On the other hand, since the lithium nickel dioxide has a charge and discharge capacity greater than the lithium cobalt dioxide, the lithium nickel dioxide has been expected to be used as a positive electrode active material which enables to produce an inexpensive battery having a high energy density.

The lithium nickel oxide has been usually prepared by mixing a lithium compound with a nickel compound such as nickel hydroxide or nickel oxyhydroxide, and calcining the resulting mixture. The form of the lithium nickel oxide is a powder in which primary particles are mono-dispersed or a powder of secondary particles formed by aggregation of primary particles and having spaces between the primary particles. However, both powders have some defects such that the powders are inferior in thermal stability under the condition of charging to the lithium cobalt dioxide. In other words, since pure lithium nickel dioxide has defects in thermal stability, charge and discharge cycle characteristics and the like, the lithium nickel dioxide cannot be used in a practical battery. This is because stability of the crystal structure of the lithium nickel dioxide is inferior to that of the lithium cobalt dioxide under the condition of charging.

Therefore, in order to stabilize crystal structure under the condition in which lithium is eliminated, and to obtain lithium-nickel composite oxide having favorable thermal stability and charge and discharge cycle characteristics as a positive electrode active material, there has been generally carried out replacement of a part of nickel contained in lithium-nickel composite oxide with other substance. For example, there has been carried out replacement of a part of nickel with a transition metal element such as cobalt, manganese or iron, or a heteroelement such as aluminum, vanadium or tin (see, for example, Patent Literature 1).

In addition, as a process for improving thermal stability of lithium-nickel composite oxide, there has been developed a process for washing lithium nickel dioxide with water after calcining (see, for example, Patent Literatures 2 and 3). When the lithium nickel dioxide is washed with water after calcining, it is thought that there can be obtained from the lithium nickel dioxide a positive electrode active material which has a high volume, and is excellent in thermal stability and preservation characteristics under high temperature circumstances in the case where the positive electrode active material is used in a non-aqueous electrolyte secondary battery.

PRIOR ART LITERATURES

Patent Literatures

Patent Literature 1: Japanese Unexamined Patent Publication No. HEI 5-242891
Patent Literature 2: Japanese Unexamined Patent Publication No. 2003-17054
Patent Literature 3: Japanese Unexamined Patent Publication No. 2007-273108

SUMMARY OF THE INVENTION

Problems to be Solved by the Invention

When a part of nickel contained in lithium-nickel composite oxide is replaced with other substance such as other element in a large amount (in other words, under the condition of low content of nickel), although thermal stability is improved, capacity of a battery is lowered.

On the other hand, when a part of nickel contained in lithium-nickel composite oxide is replaced with an element in a small amount (in other words, under the condition of high content of nickel), thermal stability is not sufficiently improved.

Moreover, when the content of nickel is increased, there also arises a problem such that synthesis of the lithium-nickel composite oxide becomes difficult due to the generation of cation mixing in calcining.

Accordingly, although there have been developed various lithium-nickel composite oxides in which a part of nickel is replaced with other substance, the lithium-nickel composite oxides have not yet sufficiently responded to the requirements for a high capacity and a high output of a non-aqueous electrolyte secondary battery.

When a process for washing lithium nickel dioxide with water is employed after calcining, there has not yet been obtained lithium nickel dioxide which responds to the requirements for a high capacity and a high output of a non-aqueous electrolyte secondary battery, as well as the above.

As mentioned above, it has not yet been prepared a positive electrode active material from lithium-nickel composite oxide which sufficiently responds to the requirements for a high capacity and a high output of a non-aqueous electrolyte secondary battery at present. Therefore, it has been desired to develop lithium-nickel composite oxide which satisfies the above requirements.

In view of the above circumstances, an object of the present invention is to provide a positive electrode active material for a non-aqueous electrolyte secondary battery, which enables to satisfy both a high capacity and a high output at the same time.

In addition, an object of the present invention is to provide a process for producing a positive electrode active material for a non-aqueous electrolyte secondary battery, which enables to easily produce the above-mentioned positive electrode active material in an industrial scale.

Furthermore, an object of the present invention is to provide a non-aqueous electrolyte secondary battery, in which the above-mentioned positive electrode active material having a high capacity, a high output and high safety is employed.

Means for Solving the Problems (Positive Electrode Active Material for Non-Aqueous Electrolyte Secondary Battery)

A positive electrode active material for a non-aqueous electrolyte secondary battery according to the first aspect of the present invention is characterized in that the positive electrode active material includes a lithium-nickel composite oxide represented by the general formula:

$$Li_bNi_{1-x-y}Co_xM_yO_2$$

wherein M is at least one element selected from the group consisting of Al, Ti, Mn and W, b satisfies 0.95≤b≤1.03, x satisfies 0<x≤0.15, y satisfies 0<y≤0.07, and the sum of x and y satisfies x+y≤0.16; and that a length of c-axis of the lithium-nickel composite oxide is 14.185 angstrom or more as determined by a Rietveld analysis of X-ray diffraction.

A positive electrode active material for a non-aqueous electrolyte secondary battery according to the second aspect of the present invention is characterized in that the above-mentioned lithium-nickel composite oxide used in the first aspect of the present invention has a porosity of 0.5 to 4% as determined by the observation of its cross section with a scanning electron microscope.

A positive electrode active material for a non-aqueous electrolyte secondary battery according to the third aspect of the present invention is characterized in that the positive electrode active material used in the first or second aspect of the present invention has an occupancy of lithium of 97 to 99% at 3a site, and an occupancy of metals other than lithium of 98.5 to 99.5% at 3b site as determined by a Rietveld analysis of X-ray diffraction.

A positive electrode active material for a non-aqueous electrolyte secondary battery according to the fourth aspect of the present invention is characterized in that the positive electrode active material used in the first, second or third aspect of the present invention has a specific surface area of 0.8 to 1.5 m²/g as determined by a BET method.

A positive electrode active material for a non-aqueous electrolyte secondary battery according to the fifth aspect of the present invention is characterized in that the positive electrode active material used in any one of the first to fourth aspects of the present invention has a mean particle diameter of 8 to 20 μm.

(Process for Producing a Positive Electrode Active Material for a Non-Aqueous Electrolyte Secondary Battery)

A process for producing a positive electrode active material for a non-aqueous electrolyte secondary battery according to the sixth aspect of the present invention is characterized in that the process includes the following processes (A) and (B):

(A) mixing a nickel composite hydroxide containing cobalt and at least one element selected from the group consisting of Al, Ti, Mn and W, a nickel composite oxyhydroxide containing cobalt and at least one element selected from the group consisting of Al, Ti, Mn and W or a nickel composite oxide containing cobalt and at least one element selected from the group consisting of Al, Ti, Mn and W with a lithium compound, and thereafter calcining the resulting mixture in an oxygen-containing atmosphere at a temperature of 700 to 780° C. so that the length of c-axis of the lithium-nickel composite oxide is 14.185 angstrom or more, to give a calcined powder of a lithium-nickel composite oxide represented by the following general formula (2):

$$Li_aNi_{1-x-y}Co_xM_yO_2 \qquad (2)$$

wherein M is at least one element selected from the group consisting of Al, Ti, Mn and W; a satisfies 0.98≤a≤1.11; x satisfies 0<x≤0.15; y satisfies 0<y≤0.07; and the sum of x and y satisfies x+y≤0.16, and (B) mixing the above-mentioned calcined powder of the lithium-nickel composite oxide with water so that the amount of the calcined powder of the lithium-nickel composite oxide is 700 g to 2000 g per 1 liter of water, to form a slurry, washing the calcined powder of the lithium-nickel composite oxide with water under the condition of maintaining a temperature of the slurry to 10 to 40° C., and thereafter filtering and drying the slurry, to give a lithium-nickel composite oxide powder.

A process for producing a positive electrode active material for a non-aqueous electrolyte secondary battery according to the seventh aspect of the present invention is characterized in that the above-mentioned nickel composite oxide is prepared by oxidizing and calcining at least one of the nickel composite hydroxide and the nickel composite oxyhydroxide at a temperature of 500 to 750° C.

A process for producing a positive electrode active material for a non-aqueous electrolyte secondary battery according to the eighth aspect of the present invention is characterized in that in the sixth aspect of the present invention, the above-mentioned nickel composite hydroxide is prepared by adding dropwise an aqueous solution containing nickel sulfate and a metal compound containing cobalt and at least one element selected from the group consisting of Al, Ti, Mn and W, and an aqueous solution containing a compound for supplying ammonium ion to a reaction solution in a reaction vessel being heated, and an aqueous solution of an alkali metal hydroxide is added dropwise to the reaction solution so that alkalinity of the reaction solution is maintained during the preparation of the nickel composite hydroxide.

A process for producing a positive electrode active material for a non-aqueous electrolyte secondary battery according to the ninth aspect of the present invention is characterized in that in the eighth aspect of the present invention, the above-mentioned nickel composite hydroxide is washed with an aqueous alkaline solution of which pH is controlled to 11 to 13 at a liquid temperature of 25° C.

A process for producing a positive electrode active material for a non-aqueous electrolyte secondary battery according to the tenth aspect of the present invention is characterized in that in the sixth aspect of the present invention, the above-mentioned nickel composite oxyhydroxide is prepared by adding an oxidizing agent to the above-mentioned nickel composite hydroxide.

A process for producing a positive electrode active material for a non-aqueous electrolyte secondary battery according to the eleventh aspect of the present invention is characterized in that in any one of the sixth to tenth aspects of the present inventions, the above-mentioned lithium compound is at least one member selected from the group consisting of lithium hydroxide, lithium oxyhydroxide, lithium oxide, lithium carbonate, lithium nitrate and lithium halide.

A process for producing a positive electrode active material for a non-aqueous electrolyte secondary battery according to the twelfth aspect of the present invention is characterized in that in any one of the sixth to eleventh aspects of the present inventions, the nickel compound is mixed with the lithium compound so that a molar ratio of lithium contained in the lithium compound to all metal elements contained in the nickel composite oxide is 0.98 to 1.11 in the above-mentioned process (A).

A process for producing a positive electrode active material for a non-aqueous electrolyte secondary battery according to the thirteenth aspect of the present invention is characterized in that in any one of the sixth to twelfth aspects of the present inventions, the temperature at washing with water in the process for washing with water is controlled to 10 to 40° C. in the above-mentioned process (B).

A process for producing a positive electrode active material for a non-aqueous electrolyte secondary battery according to the fourteenth aspect of the present invention is characterized in that in any one of the sixth to thirteenth aspects of the present inventions, the calcined powder is dried after the process for washing with water in an atmosphere not containing a compound including carbon or a reduced-pressure atmosphere in the above-mentioned process (B).

(Non-Aqueous Electrolyte Secondary Battery)

A non-aqueous electrolyte secondary battery of the fifteenth aspect according to the present invention is characterized in that the positive electrode active material for a non-aqueous electrolyte secondary battery according to any one of the first to fifth aspects of the present inventions is used in the non-aqueous electrolyte secondary battery.

Effects of the Invention (Positive Electrode Active Material for Non-Aqueous Electrolyte Secondary Battery)

According to the first aspect of the present invention, when the electrode active material is used as a positive electrode active material for a non-aqueous electrolyte secondary battery, a secondary battery having a high capacity, a high output and high safety can be obtained.

According to the second aspect of the present invention, an electrolyte solution can be sufficiently permeated to the surface of primary particles existing inside the secondary particle, and battery capacity and output characteristics can be furthermore improved.

According to the third aspect of the present invention, lithium-nickel composite oxide would not generate cation mixing, its crystallinity becomes higher, and higher charge and discharge capacity and higher output can be achieved.

According to the fourth aspect of the present invention, safety of a battery can be furthermore improved with maintaining a high battery capacity and high output characteristics.

According to the fifth aspect of the present invention, filling density in a positive electrode of a battery can be improved with maintaining a high battery capacity and high output characteristics.

(Process for Producing a Positive Electrode Active Material for a Non-Aqueous Electrolyte Secondary Battery)

According to the sixth aspect of the present invention, there can be prepared a lithium-nickel composite oxide having a length of c-axis of 14.185 angstrom or more which is determined by a Rietveld analysis of X-ray diffraction and a porosity of 0.5 to 4% even when the lithium-nickel composite oxide contains nickel in a high content. Therefore, when the lithium-nickel composite oxide is used as a positive electrode active material, thermal stability and the like can be maintained, and moreover higher capacity and higher output can be achieved by the facility of releasing and inserting of lithium ions.

According to the seventh aspect of the present invention, when a lithium-nickel composite oxide is prepared, the ratio of lithium to metals other than lithium in the lithium-nickel composite oxide can be stabilized. Therefore, a positive electrode active material having higher capacity and higher output can be obtained by using the lithium-nickel composite oxide.

According to the eighth aspect of the present invention, since a lithium-nickel composite oxide powder having a high bulk density can be prepared, a lithium-nickel composite oxide having a smaller specific surface area after washing with water can be easily prepared therefrom.

According to the ninth aspect of the present invention, the content of sulfate radical in the nickel composite hydroxide can be easily controlled, and crystallinity and porosity of a lithium-nickel composite oxide can be easily controlled.

According to the tenth aspect of the present invention, since a lithium-nickel composite oxide powder having a high bulk density can be prepared, a lithium-nickel composite oxide having a smaller specific surface area after washing with water can be easily prepared therefrom.

According to the eleventh aspect of the present invention, since an impurity does not remain after calcining, when the positive electrode active material is used in a positive electrode, electric resistance of the positive electrode can be lowered.

According to the twelfth aspect of the present invention, since crystallinity of calcined powder can be improved, and an excessive lithium compound existing on the surface of a particle can be reduced, a battery having a higher capacity and a higher output can be obtained.

According to the thirteenth aspect of the present invention, since elution of lithium in washing with water can be inhibited, a high capacity, a high output and high safety can be achieved at the same time.

According to the fourteenth aspect of the present invention, since the content of moisture in the lithium-nickel composite oxide can be sufficiently reduced, when the lithium-nickel composite oxide is used as a positive electrode active material of a non-aqueous electrolyte secondary battery, generation of gas derived from moisture can be inhibited.

(Non-Aqueous Electrolyte Secondary Battery)

According to the fifteenth aspect of the present invention, since the positive electrode active material according to any one of the first to fourth aspects of the present inventions is used, cycle characteristics can be improved with maintaining high capacity and high safety.

BRIEF EXPLANATION OF DRAWINGS

FIG. 1 is a schematic cross-sectional drawing of a coin type battery 1 which is used in evaluation of a battery.

FIG. 2 is a schematic explanatory drawing of an equivalent circuit which is used in a measurement example for evaluation of impedance and analysis of the impedance.

MODE FOR CARRYING OUT THE INVENTION

The positive electrode active material for a non-aqueous electrolyte secondary battery of the present invention can increase capacity and output of a secondary battery, and can improve safety of a secondary battery when the positive electrode active material is used as a positive electrode active material for a non-aqueous electrolyte secondary battery.

More specifically, the positive electrode active material for a non-aqueous electrolyte secondary battery of the present invention can maintain thermal stability and the like by controlling the length of c-axis of the lithium-nickel composite oxide as determined by a Rietveld analysis of X-ray diffraction even when the positive electrode active material has a high content of nickel, and can realize higher capacity and higher output by further controlling the porosity of the lithium-nickel composite oxide particle to increase the easiness for releasing and inserting of lithium ions.

For example, when the positive electrode active material for a non-aqueous electrolyte secondary battery of the present invention is used as a positive electrode active material for a C2032-type coin battery, there can be obtained a non-aqueous electrolyte secondary battery having a high capacity of 205 mAh/g or more and a high output. In other words, the positive electrode active material of the present invention is suitable for use as a positive electrode active material for a non-aqueous electrolyte secondary battery.

Hereinafter, the positive electrode active material for a non-aqueous electrolyte secondary battery of the present invention is specifically described.
(Positive Electrode Active Material for a Non-Aqueous Electrolyte Secondary Battery)

The positive electrode active material for a non-aqueous electrolyte secondary battery of the present invention (hereinafter simply referred to as positive electrode active material of the present invention) is a positive electrode active material which includes a lithium-nickel composite oxide represented by the following general formula (1):

$$Li_bNi_{1-x-y}Co_xM_yO_2 \qquad (1)$$

wherein M is at least one element selected from the group consisting of Al, Ti, Mn and W, b satisfies $0.95 \leq b \leq 1.03$, x satisfies $0 < x \leq 0.15$, y satisfies $0 < y \leq 0.07$, and the sum of x and y satisfies $x+y \leq 0.16$, and is characterized in that a length of c-axis of the lithium-nickel composite oxide is 14.185 angstrom or more as determined by a Rietveld analysis of X-ray diffraction, and that a porosity of the lithium-nickel composite oxide is 0.5 to 4% as determined by observing the cross section of the lithium-nickel composite oxide with a scanning electron microscope.

(Content of Ni)

The positive electrode active material of the present invention includes a lithium-nickel composite oxide classified into hexagonal system, in which "1-x-y" showing the content of nickel (Ni) in the above-mentioned general formula is 0.84 or more.

The upper limit of the content of nickel in the positive electrode active material of the present invention is not particularly limited. The higher the content of nickel in the positive electrode active material is, the higher the capacity of the positive electrode active material becomes. However, when the content of nickel in the positive electrode active material is excessively higher, thermal stability of the secondary battery becomes insufficient, or cation mixing is apt to be easily generated in calcining.

To the contrary, when the content of nickel in the positive electrode active material is too low, capacity is lowered. When the content of nickel in the positive electrode active material is less than 0.84, there arise some problems such that the capacity of a battery per volume of the battery cannot be sufficiently increased even when filling density of the positive electrode is increased.

Therefore, the content of nickel in the positive electrode active material of the present invention is preferably 0.84 or more and 0.98 or less, more preferably 0.845 or more and 0.950 or less, furthermore preferably 0.85 or more and 0.95 or less.
(Content of Co)

The positive electrode active material of the present invention contains cobalt (Co). Since the positive electrode active material contains cobalt, cycle characteristics of the positive electrode active material can be improved.

In the positive electrode active material of the present invention, in accordance with the increase of the content of cobalt, cycle characteristics of the positive electrode active material can be more improved. On the other hand, when the content of cobalt exceeds 0.15, it becomes difficult to increase the capacity of the positive electrode active material.

Therefore, in order to improve cycle characteristics of the positive electrode active material of the present invention, and to achieve higher capacity, the content of cobalt, which is denoted by "x" in the above-mentioned general formula is controlled to $0 < x \leq 0.15$.

On the other hand, when the content of cobalt is excessively low, since there is a possibility such that cycle characteristics of the positive electrode active material cannot be sufficiently improved by including cobalt, the content of cobalt "x" in the positive electrode active material of the present invention satisfies preferably $0.03 \leq x \leq 0.15$, more preferably $0.05 \leq x \leq 0.12$.

(Content of Additional Element)

The positive electrode active material of the present invention may contain an element other than cobalt in order to improve battery characteristics.

For example, when at least one element selected from the group consisting of Al, Ti, Mn and W is added to the positive electrode active material as an additional element which is denoted by "M" in the above-mentioned general formula, battery characteristics such as thermal stability can be improved.

When the amount of the additional element, which is denoted by "y" in the above-mentioned general formula, exceeds 0.07, it becomes difficult to achieve higher capacity of the positive electrode active material. When the additional element is not added to the positive electrode active material, battery characteristics cannot be improved. Therefore, it is preferred that the amount of the additional element is controlled to 0.01 or more in order to sufficiently improve battery characteristics.

Accordingly, in order to improve battery characteristics of the positive electrode active material of the present invention, and achieve its higher capacity, "y" satisfies 0<y≤0.07, preferably 0.01≤y≤0.05.

(Content of Li)

The content of lithium (Li) which is denoted by "b" in the above-mentioned general formula in the positive electrode active material of the present invention is 0.95 or more and 1.03 or less.

When the content of lithium is less than 0.95, battery capacity is lowered, and output characteristics are lowered, since a metal element such as Ni is contaminated in a lithium layer contained in a layered compound, and inserting and releasing property of Li is lowered. On the other hand, when the content of lithium exceeds 1.03, battery capacity is decreased since Li is contaminated in a metal layer of the layered compound.

Therefore, the content of lithium in the positive electrode active material of the present invention is 0.95≤b≤1.03, preferably 0.95≤b≤1.01 from the viewpoint of maintenance of battery capacity and output characteristics.

(Length of c-Axis)

As mentioned above, the content of nickel in the positive electrode active material of the present invention is 0.84 or more, preferably 0.98 or more. Therefore, the positive electrode active material contains nickel in a very high content. As mentioned above, in accordance the increase of the content of nickel, there arises some problems such that thermal stability is lowered, and the like. Therefore, the content of nickel is usually controlled so as to be less than 0.84 (the content is generally 0.80 or so).

In contrast, according to the positive electrode active material of the present invention, since the length of c-axis of the lithium-nickel composite oxide as determined by a Rietveld analysis of X-ray diffraction of its crystal is appropriately controlled, a high content of nickel as mentioned above can be achieved.

In other words, according to the positive electrode active material of the present invention, it makes possible to achieve a high content of nickel by controlling the length of c-axis (hereinafter, simply referred to as length of c-axis) of the lithium-nickel composite oxide to 14.185 angstrom or more as determined by a Rietveld analysis of X-ray diffraction of its crystal.

In addition, in case of the lithium-nickel composite oxide having a hexagonal system, such as the positive electrode active material of the present invention, the length of c-axis affects releasing property of lithium from a crystal or inserting property of lithium to a crystal. Generally, in accordance with the increase of the length of c-axis, the interlayer distance between each lithium layer increases. Therefore, releasing property of lithium from a crystal or inserting property of lithium to a crystal is improved. Accordingly, when the lithium-nickel composite oxide is used as a positive electrode active material, there can be obtained a positive electrode active material having a high capacity and a high output.

On the other hand, when the length of c-axis is shorter, since releasing property of lithium from a crystal or inserting property of lithium to a crystal is lowered. Therefore, when the lithium-nickel composite oxide is used as a positive electrode active material, capacity and output of the lithium-nickel composite oxide is lowered. In addition, since crystallinity is lowered by cation mixing, cycle characteristics and thermal stability of the lithium-nickel composite oxide are lowered. For example, when the length of c-axis is less than 14.185 angstrom, since releasing property of lithium from a crystal or inserting property of lithium to a crystal is lowered, battery capacity and output characteristics are lowered.

As mentioned above, since the positive electrode active material of the present invention has a length of c-axis of 14.185 angstrom or more, releasing property of lithium from a crystal or inserting property of lithium to a crystal of the positive electrode active material is improved, and the positive electrode active material has a high capacity and a high output.

In other words, since the positive electrode active material of the present invention has a length of c-axis of 14.185 angstrom or more, capacity and output of the positive electrode active material can be improved by the increase of the length of c-axis, as well as a high capacity of the positive electrode active material based on the increase of the content of nickel.

Incidentally, the upper limit of length of c-axis is not particularly limited, and the length of c-axis is preferably 14.205 angstrom or less. In other words, the length of c-axis of the positive electrode active material of the present invention is preferably 14.185 angstrom or more and 14.205 angstrom or less, more preferably 14.185 angstrom or more and 14.203 angstrom or less. Controlling the length of c-axis to 14.185 angstrom or more and 14.200 angstrom or less is more preferred from the viewpoint of improvement in capacity and thermal stability based on high crystallinity. When the length of c-axis is too long, there is a possibility such that battery capacity cannot be sufficiently improved due to the lowering of crystallinity.

(Porosity)

The positive electrode active material of the present invention includes secondary particles formed by aggregation of primary particles of the lithium-nickel composite oxide. It is preferred that a porosity of the secondary particle is 0.5 to 4% as determined by observing its cross section with a scanning electron microscope. Since the aggregated primary particles are used, releasing and inserting of lithium based on the contact with an electrolyte solution occur on the surface of the primary particles. Therefore, the releasing and inserting of lithium occur not only on the surface of the secondary particle formed by the aggregation of primary particles, but also in the vicinity of the surface of the second particle, vacancy in the second particle and on incomplete grain boundary. There is a possibility that fine primary particles are slightly contained in the positive electrode active material, and most of the particles are formed into secondary particles. When the second particle has only the above-mentioned structure based on aggregation of particles, contact of the particles with an electrolyte solution is insufficient. However, when the above-mentioned porosity of the secondary particle is controlled, since the electrolyte solution can be more sufficiently permeated to the secondary particles and attained to the surfaces of primary particles, battery capacity and output characteristics can be improved.

When the porosity is less than 0.5%, there is a possibility that the electrolyte solution cannot be permeated to the secondary particles, which causes insufficient contact of the surfaces of primary particles with the electrolyte solution. On the other hand, when the porosity exceeds 4%, there is a possibility that thermal stability is lowered by the excess contact of the surfaces of primary particles with the electrolyte solution.

Incidentally, the porosity can be determined by observing arbitrary cross section of the above-mentioned secondary particle with a scanning electron microscope, and analyzing the image of the cross section.

The porosity can be determined, for example, by embedding plural secondary particles in a resin or the like; carrying out cross section polisher processing of the resin, or the like so as to enable to observe the cross section of secondary particles; selecting arbitrary 20 particles of secondary particles; coloring the vacant part in the secondary particle black to form a black part, and coloring the compact part within an outline of the secondary particle white to form a white part by means of an image analysis soft such as Win Roof 6.1.1; measuring the total area of the black part and the white part; and calculating the area ratio in accordance with the formula: [area of black part/(area of black part+area of white part)] to determine a porosity.

(Occupancy In Site)

In the positive electrode active material of the present invention, it is preferred that occupancy of lithium (Li) at 3a site is 97 to 99%, and that occupancy of metals other than lithium at 3b site is 98.5 to 99.5%, as determined by the Rietveld analysis of X-ray diffraction.

When each occupancy at 3a site and 3b site is controlled so as to be within the above-mentioned range respectively, there can be achieved high crystallinity, high charge and discharge capacity and high output characteristics without the occurrence of cation mixing of the lithium-nickel composite oxide. On the other hand, when each occupancy is without the above-mentioned range, crystallinity is lowered, and a lot of metals other than Li are contaminated in 3a site which is to be originally occupied by Li. Therefore, migration of Li is remarkably disturbed by the above-mentioned metals, or an effect of inactivation of Li which is contaminated in 3b site becomes remarkable, and thereby battery characteristics are sometimes lowered.

(Specific Surface Area)

It is preferred that a specific surface area of the positive electrode active material of the present invention is 0.8 to 1.5 m$^2$/g as determined by a BET method. Thereby, the contact of the positive electrode active material with an electrolyte solution becomes satisfactory, and charge and discharge capacity and output characteristics are improved. On the other hand, when the specific surface area is smaller than 0.8 m$^2$/g, the contact of the positive electrode active material with an electrolyte solution becomes insufficient, and battery characteristics are sometimes lowered. In addition, when the specific surface area exceeds 1.5 m$^2$/g, thermal stability is sometimes lowered.

(Mean Particle Diameter)

It is preferred that the positive electrode active material of the present invention has a mean particle diameter of 8 to 20 μm.

When the mean particle diameter of the positive electrode active material is smaller than 8 μm, filling density is lowered in the case that the positive electrode active material is used as a positive electrode active material of a battery, and battery capacity per volume is sometimes lowered.

On the other hand, the mean particle diameter of the positive electrode active material exceeds 20 μm, the contact area of the positive electrode active material with an electrolyte solution of a battery is lowered, and battery capacity and output characteristics are sometimes lowered.

Accordingly, the mean particle diameter of the positive electrode active material of the present invention is preferably 8 to 20 μm, more preferably 8 to 17 μm from the viewpoint of improvement in filling density in the positive electrode with maintaining battery capacity and output characteristics.

(Process for Producing a Positive Electrode Active Material for a Non-Aqueous Electrolyte Secondary Battery)

Next, the above-mentioned process for producing a positive electrode active material for a non-aqueous electrolyte secondary battery of the present invention (hereinafter referred to as process of the present invention) is described.

The process for producing a positive electrode active material of the present invention is characterized in that the process includes (A) a process for calcining and (B) a process for washing with water as mentioned below.

(A) Process for Calcining

First of all, in the process for calcining, a mixture prepared by mixing a nickel composite hydroxide, a nickel composite oxyhydroxide or a nickel composite oxide (hereinafter simply referred to as nickel compound) with a lithium compound is calcined in an oxygen-containing atmosphere such as oxygen atmosphere at a temperature of 700 to 780° C., to give a calcined powder of a lithium-nickel composite oxide represented by the following general formula (2):

$$Li_aNi_{1-x-y}Co_xM_yO_2 \quad (2)$$

wherein M is at least one element selected from the group consisting of Al, Ti, Mn and W, a satisfies 0.98≤a≤1.11, x satisfies 0<x≤0.15, y satisfies 0<y≤0.07, and the sum of x and y satisfies x+y≤0.16.

(B) Process for Washing with Water

In the process for washing with water, the calcined powder of the lithium-nickel composite oxide obtained in the (A) process for calcining is washed with water. More specifically, the calcined powder is mixed with water so that the amount of the calcined powder is 700 g to 2000 g per 1 L of water to give a slurry, the slurry is washed with water at a temperature of 10 to 40° C., and then the slurry is filtered and dried, to give a powder of a lithium-nickel composite oxide (washed powder with water).

According to the process of the present invention, the above-mentioned positive electrode active material for a non-aqueous electrolyte secondary battery of the present invention can be prepared. More specifically, there can be prepared a lithium-nickel composite oxide having a length of c-axis of 14.185 angstrom or more as determined by a Rietveld analysis of X-ray diffraction, even when the lithium-nickel composite oxide has a high content of nickel. Therefore, when the lithium-nickel composite oxide obtained in the above is used as a positive electrode active material, the positive electrode active material can maintain thermal stability and the like, and moreover a high capacity and a high output of the positive electrode active material can be achieved since lithium ions can be easily released from the positive electrode active material or inserted to the positive electrode active material.

Hereinafter, (A) a process for calcining and (B) a process for washing with water are specifically described.

(A) Process for Calcining (A) The process for calcining is a process for calcining a mixture prepared by mixing the nickel compound with the lithium compound, to give a calcined powder of a lithium-nickel composite oxide represented by the above-mentioned general formula (2).

(Nickel Compound)

A nickel compound which is used in the (A) process for calcining is a nickel composite hydroxide, a nickel composite oxyhydroxide or a nickel composite oxide, each of which contains cobalt, and at least one element selected from the group consisting of Al, Ti, Mn and W, and preferably further containing 0.1 to 0.4% by weight of sulfate radical.

(Nickel Composite Hydroxide)

A nickel composite hydroxide which is used in the (A) process for calcining is not particularly limited so long as the nickel composite hydroxide contains the above-mentioned additional element. As the nickel composite hydroxide, there can be used a nickel composite hydroxide which is prepared by, for example, a process such as a crystallization method, a coprecipitation method or a homogeneous precipitation method.

According to the crystallization method, a nickel composite hydroxide can be prepared under various conditions. The conditions for preparing the nickel composite hydroxide are not particularly limited, and it is preferred that a nickel composite hydroxide is prepared under the following conditions:

More specifically, it is preferred that a nickel composite hydroxide is prepared by adding dropwise an aqueous solution containing nickel sulfate and a metal compound which includes cobalt and at least one element selected from the group consisting of Al, Ti, Mn and W, and an aqueous solution containing a compound for supplying ammonium ion to a reaction vessel which is heated to 40 to 60° C.

In particular, it is preferred that the nickel composite hydroxide is prepared by adding dropwise an aqueous solution of an alkali metal hydroxide to a reaction vessel as occasion demands so that a reaction solution becomes alkaline, preferably has a pH of 10 to 14. The element used as the additional element can be precipitated together with nickel. The nickel composite hydroxide also can be obtained by a process for preparing a nickel hydroxide with crystallization, and then covering the nickel hydroxide with a metal compound containing an element which is used as the additional element, or a process for impregnating an aqueous solution containing the metal compound to the nickel hydroxide.

The nickel hydroxide prepared by the above-mentioned crystallization method is a powder having a high bulk density. Therefore, a lithium-nickel composite oxide having a small specific surface area can be easily prepared after washing with water. Accordingly, there can be obtained a nickel composite hydroxide which is suitable for a raw material of a lithium-nickel composite oxide used as a positive electrode active material for a non-aqueous electrolyte secondary battery.

When the nickel hydroxide is crystallized under the condition such that the temperature of a reaction solution exceeds 60° C., or that a pH of the reaction solution exceeds 14, since a nuclear is preferentially generated in the solution, and growth of a crystal does not proceed, only a fine powder is formed. On the other hand, when the nickel hydroxide is crystallized under the condition such that the temperature of the reaction solution is lower than 40° C., or that a pH of the reaction solution is lower than 10, the amount of a nuclear generated in the solution becomes smaller, and a crystal of a particle preferentially grows up. In this case, there is a possibility that an obtained nickel hydroxide contains a very large particle which generates a concave and convex shape when an electrode is produced, and that the reaction solution contains metal ions of which reaction efficiency is very low in a large residual amount.

Therefore, when the nickel composite hydroxide which is used as a nickel compound used in the (A) process for calcining is prepared by a crystallization method, it is preferred that the nickel composite hydroxide is prepared under the conditions such that the temperature of the reaction solution is maintained to 40 to 60° C., and that the reaction solution is maintained to alkaline, preferably a pH of 10 to 14.

(Nickel Composite Oxyhydroxide)

In the (A) process for calcining, a nickel composite oxyhydroxide also can be used as the nickel compound. In other words, a nickel composite oxyhydroxide containing cobalt and at least one element selected from the group consisting of Al, Ti, Mn and W can be used as the nickel compound.

The process for preparing a nickel composite oxyhydroxide is not particularly limited. It is preferred to use a nickel composite oxyhydroxide which is prepared by further adding an oxidizing agent such as sodium hypochlorite or aqueous hydrogen peroxide to the above-mentioned nickel hydroxide. Since the nickel composite oxyhydroxide prepared by this method becomes a powder having a high bulk density, a lithium-nickel composite oxide having a small specific surface area after washing with water can be easily prepared from the nickel composite oxyhydroxide. Accordingly, the nickel composite oxyhydroxide is suitable for a raw material of a lithium-nickel composite oxide used in a positive electrode active material for a non-aqueous electrolyte secondary battery.

(Nickel Composite Oxide)

In the (A) process for calcining, a nickel composite oxide also can be used as the nickel compound. In other words, a nickel composite oxide containing cobalt and at least one element selected from the group consisting of Al, Ti, Mn and W also can be used as the nickel compound.

A process for producing the nickel composite oxide is not particularly limited. It is preferred that the nickel composite oxide is prepared by oxidizing and calcining the above-mentioned nickel composite hydroxide or the nickel composite oxyhydroxide in an oxygen-containing atmosphere at a temperature of 500 to 750° C., preferably 550 to 700° C. When the nickel composite oxide prepared by this method is used, a composition ratio of Li to metals other than Li in the lithium-nickel composite oxide can be stabilized in preparing a lithium-nickel composite oxide by calcining a mixture of the nickel compound and the lithium compound. Thereby, there can be obtained an advantage such that capacity and output can be increased when the lithium-nickel composite oxide is used as a positive electrode active material.

Incidentally, when the temperature for oxidizing and calcining is lower than 500° C. in oxidizing and calcining the nickel composite hydroxide or the nickel composite oxyhydroxide, conversion of the nickel composite hydroxide and the like to their oxides sometimes becomes incomplete. At that time, it is difficult to stabilize the quality of the lithium-nickel composite oxide which is obtained by using the nickel composite oxide in which conversion from the nickel composite hydroxide to the nickel composite oxide is incomplete, and disproportionation of composition during synthesis is apt to occur. In addition, when a nickel composite hydroxide and the like are remaining in the nickel composite oxide obtained after oxidizing and calcining, water vapor is generated in calcining. Therefore, there sometimes arise some problems such that the reaction of the lithium compound with the nickel composite oxide is inhibited, and that crystallinity is lowered.

On the other hand, when the temperature for oxidizing ad calcining exceeds 750° C., crystallinity of an obtained nickel composite oxide becomes higher, and reactivity of the lithium compound with the nickel composite oxide is lowered in a post calcining process. Therefore, crystallinity of a finally obtained lithium-nickel composite oxide is lowered, and the length of c-axis sometimes does not become 14.185 angstrom or more. Moreover, there are some possibilities such that primary particles which compose a nickel composite oxide particle quickly grow up, to cause the formation of gross nickel composite oxide particles, and that the mean particle diameter of the lithium-nickel composite oxide which is obtained by mixing the lithium compound with the nickel composite oxide and calcining the resulting mixture becomes excessively large.

Accordingly, when the nickel composite oxide is prepared by oxidizing and calcining the nickel composite hydroxide or the nickel composite oxyhydroxide in an oxygen-containing atmosphere, the oxidizing and calcining process is carried out at a temperature of preferably 500 to 750° C., more preferably 550 to 700° C.

In addition, the period of time for maintaining the temperature for oxidizing and calcining is preferably 1 to 10 hours, more preferably 2 to 6 hours. When the period of time is shorter than 1 hour, conversion to an oxide sometimes becomes incomplete. When the period of time exceeds 10 hours, crystallinity of the nickel composite oxide sometimes becomes excessively high.

Incidentally, the atmosphere in oxidizing and calcining can be an oxygen-containing atmosphere, and is preferably the air in consideration of easiness in handling and cost.

The content of sulfate radical ($SO_4$) in the nickel composite hydroxide which is used as a nickel compound is preferably 0.1 to 0.4% by weight, more preferably 0.1 to 0.3% by weight. Thereby, crystallinity of a lithium-nickel composite oxide can be easily controlled in the post calcining process.

In other words, when the content of the sulfate radical in the nickel composite hydroxide is controlled to 0.1 to 0.4% by weight, the length of c-axis can be easily controlled. In addition, since contraction of the secondary particle due to the growth of primary particles in calcining can be appropriately controlled, a porosity of the secondary particle can be easily controlled.

However, when the content of the sulfate radical is less than 0.1% by weight, progressing speed of crystallization in calcining becomes excessively high, and the length of c-axis does not sometimes become 14.185 angstrom or more. On the other hand, when the content of the sulfate radical exceeds 0.4% by weight, since growth of primary particles is inhibited, a porosity of the secondary particle becomes excessively large. Also, since crystallization is inhibited, battery characteristic are lowered.

In addition, the nickel composite oxyhydroxide and the nickel composite oxide, which are obtained from the nickel composite hydroxide, contain the sulfate radical in the approximately same content as in the nickel composite hydroxide.

Therefore, when the content of the sulfate radical ($SO_4$) in the nickel composite hydroxide is controlled to 0.1 to 0.4% by weight, an active material obtained by using a nickel composite oxyhydroxide which is obtained from the nickel composite hydroxide or a nickel composite oxide as a raw material also exhibits the same effects as mentioned above.

It is preferred that the above-mentioned nickel composite hydroxide is a nickel composite obtained by a crystallization method. When a sulfate such as nickel sulfate is used as a raw material, and the resulting crystal is sufficiently washed with water several times after crystallization, a nickel composite hydroxide containing 0.1 to 0.4% by weight of the sulfate radical is obtained.

Furthermore, it is preferred that washing is carried out by using an aqueous alkaline solution of which pH is controlled to 11 to 13 at a liquid temperature of 25° C. When the pH of the aqueous alkaline solution is lower than 11, the content of the sulfate radical sometimes cannot be lowered to 0.1 to 0.4% by weight. When the pH of the aqueous alkaline solution exceeds 13, not only an effect for decreasing the amount of the sulfate radical is not so improved, but also there is a possibility that a cation would remain in the aqueous alkaline solution as an impurity.

As the aqueous alkaline solution, an aqueous solution of an alkali metal hydroxide such as sodium hydroxide and an aqueous solution of a carbonate such as sodium carbonate are preferably used. For example, when the aqueous solution of sodium carbonate is used, it is preferred that washing is carried out by controlling a pH to 11 to 12 at a liquid temperature of 25° C.

As mentioned above, since the sulfate radical affects crystallization in calcining, the content of the sulfate radical in the nickel compound which is used in calcining can be within the above-mentioned range. Accordingly, the content of the sulfate radical can be adjusted by washing the nickel composite oxyhydroxide or the nickel composite oxide, preferably by washing with the aqueous alkaline solution.

(Lithium Compound)

The lithium compound which is mixed with the nickel compound is not particularly limited, and it is preferred that at least one member selected from the group consisting of lithium hydroxide, lithium oxyhydroxide, lithium oxide, lithium carbonate, lithium nitrate and lithium halide is used as the lithium compound. When the lithium compound is used, there are some advantages such that an impurity would not remain after calcining.

(Molar Ratio of Lithium Compound)

The mixing ratio of the nickel compound to the lithium compound is not particularly limited. The composition of lithium and metals other than lithium in the lithium-nickel composite oxide after calcining is approximately maintained in the mixture obtained by mixing the nickel compound with the lithium compound. Therefore, it is preferred that the molar ratio of lithium contained in the lithium compound to the total amount of nickel and other metal elements contained in the nickel compound is controlled so as to be 0.98 to 1.11.

When the molar ratio is less than 0.98, crystallinity of the resulting calcined powder is so lowered. Moreover, the molar ratio of lithium to the metals other than lithium sometimes becomes less than 0.95 in the lithium-nickel composite oxide after the (B) process for washing, and becomes a factor for causing great lowering in a battery capacity in a charging and discharging cycle.

On the other hand, when the molar ratio exceeds 1.11, since calcining is easily proceeded, and calcination is apt to be excessively progressed, there is a possibility that the molar ratio exceeds 1.11 in the resulting calcined powder. Moreover, the excessive lithium compound exists on the surface of the resulting calcined powder in a large amount, and removal of the excessive lithium compound becomes difficult by washing with water. When the calcined powder thus obtained is used as a positive electrode active material, not only gas is generated from the calcined powder in a large amount during charging a battery, but also since the calcined powder is a powder showing a high pH, the calcined powder becomes a factor which arises a problem such that the calcined powder reacts with a material such as an organic solvent used in producing an electrode, to form a gelled slurry. Furthermore, there is a possibility that the molar ratio in the lithium-nickel composite oxide exceeds 1.03 after washing with water, and when the lithium-nickel composite oxide is used as a positive electrode active material for a battery, there is a possibility such that its battery capacity is lowered, and that internal resistance of the positive electrode increases.

Therefore, it is preferred that the mixing ratio of the nickel compound to the lithium compound is controlled so that the molar ratio of lithium contained in the lithium compound to the total amount of nickel and other metal elements contained in the nickel compound is 0.98 to 1.11.

(Calcination)

The mixture obtained by mixing the nickel compound with the lithium compound is calcined in an oxygen-containing atmosphere at a temperature of 700 to 780° C., preferably at a temperature of 730 to 760° C.

When the mixture is calcined at a temperature exceeding 500° C., a lithium-nickel composite oxide is generated. However, when the temperature is lower than 700° C., the resulting crystal does not sufficiently grow up, and its structure becomes unstable. When the lithium-nickel composite oxide thus obtained is used as a positive electrode active material, the crystal structure of the positive electrode active material is easily destroyed by its phase transition and the like in charging and discharging.

On the other hand, when the mixture is calcined at a temperature exceeding 780° C., since cation mixing is easily generated, and a layered structure of the crystal of the lithium-nickel composite oxide is collapsed, there is a possibility that insertion and release of lithium ions become difficult. In addition, the length of c-axis does not become 14.185 angstrom or more. Moreover, there are some possibilities such that the crystal of the lithium-nickel composite oxide is decomposed to generate nickel oxide, and the like. Furthermore, there are some possibilities such that the particles of the lithium-nickel composite oxide are sintered to form a gross particle of the lithium-nickel composite oxide, and that a mean particle diameter of the lithium-nickel composite oxide becomes excessively large.

Therefore, it is preferred that the mixture obtained by mixing the nickel compound with the lithium compound is calcined in an oxygen-containing atmosphere at a temperature of 700 to 780° C., preferably at a temperature of 730 to 760° C. In addition, a period of time for retaining at a temperature of calcining is preferably 1 to 6 hours, more preferably 2 to 4 hours. When the period of time for retaining is shorter than 1 hour, crystallization sometimes becomes insufficient. When the period of time for retaining exceeds 6 hours, calcining is excessively proceeded, and cation mixing sometimes occurs.

In particular, in order to remove crystallization water from the lithium compound, and carry out a reaction homogeneously within a temperature range in which the crystal of the lithium-nickel composite oxide grows up, it is especially preferred that calcining is carried out in two steps of calcining at a temperature of 400 to 600° C. for 1 to 5 hours and subsequently calcining at a temperature of 700 to 780° C. for 3 hours or more.

The above-mentioned calcining can be carried out in an oxidizing atmosphere, preferably an atmosphere of a mixed gas having an oxygen concentration of 18 to 100% by volume of oxygen and an inert gas, more preferably an atmosphere of mixed gas having an oxygen concentration of 90% by volume or more.

When calcining is carried out in an atmosphere having an oxygen concentration of 18% by volume or more, that is, an atmosphere of which oxygen content is higher than the air, a lithium-nickel composite oxide can be synthesized.

In particular, in order to increase the reactivity between the lithium compound and the nickel compound, to give a lithium-nickel composite oxide excellent in crystallinity, the atmosphere is preferably an atmosphere of a mixed gas having an oxygen concentration of 90% by volume or more, more preferably an oxygen atmosphere, that is, an oxygen atmosphere having an oxygen concentration of 100%.

Incidentally, the nickel compound is mixed with the lithium compound prior to calcination. An apparatus and a process for mixing them are not particularly limited so long as the nickel compound can be homogeneously mixed with the lithium compound. There can be used as the apparatus, for example, a dry type mixture such as a V-blender, a mixing-granulation apparatus, and the like.

In addition, an apparatus and a process for calcining a mixture prepared by mixing the nickel compound with the lithium compound are not particularly limited. As the apparatus, there can be used, for example, a calcining furnace such as an electric furnace, a kiln, a tube furnace or a pusher furnace, in which its atmosphere can be controlled to an oxygen atmosphere or an atmosphere having an oxygen concentration of 18% by volume or more, such as dried air prepared by removing moisture and carbon dioxide from the air.

(B) Process for Washing with Water

In the process for washing with water, the calcined powder of the lithium-nickel composite oxide obtained in the (A) process for calcining is washed with water. More specifically, the calcined powder is mixed with water so that the amount of the calcined powder is 700 g to 2000 g based on 1 liter of water, to form a slurry, the slurry is washed with water, and then the washed slurry is filtered and dried, to give a powder of a lithium-nickel composite oxide (washed powder with water).

(Concentration of Slurry)

In the above-mentioned washing with water, the calcined powder of the lithium-nickel composite oxide is mixed with water to form slurry, and this slurry is stirred to clean the calcined powder of the lithium-nickel composite oxide. At that time, the amount (g) of the calcined powder of the lithium-nickel composite oxide is controlled so as to be 700 to 2000 g, preferably 700 to 1500 g based on 1 liter of water contained in the slurry.

In other words, in accordance with increase of the concentration of the slurry, the amount of the calcined powder of the lithium-nickel composite oxide increases in the slurry. When the concentration of the slurry exceeds 2000 g/L, stirring of the slurry becomes difficult since the viscosity of the slurry increases. Moreover, since the concentration of alkali increases in the liquid of the slurry, the dissolution rate of a deposit adhered to the powder is lowered in accordance with their equilibrium, and when the deposit is exfoliated from the powder, it becomes difficult to separate the exfoliated deposit from the powder.

On the other hand, when the concentration of the slurry is lower than 700 g/L, since the concentration is excessively low, the amount of lithium eluted from the surface of each particle to the liquid increases. In particular, the higher the content of the nickel ratio is, the more the eluted amount of lithium is, and the amount of lithium existing on the surface of the particle is reduced. At that time, lithium comes to be removed from the crystal lattice of the lithium-nickel composite oxide, and the crystal comes to be easily collapsed.

Therefore, when the lithium-nickel composite oxide thus obtained is used as a positive electrode active material, battery capacity is lowered.

Accordingly, in view of productivity in an industrial scale, the concentration of the slurry is controlled to 700 to 2000 g/L, preferably 700 to 1500 g/L when washing with water is carried out from the viewpoint of capacity of facilities and workability.

(Temperature of Water)

In the process for washing with water, the temperature in washing with water, that is, the temperature of the slurry is controlled so as to be preferably 10 to 40° C. When the temperature in washing with water is controlled to the above temperature, an impurity existing on the surface of the particle of the lithium-nickel composite oxide can be removed, and the amount of lithium existing on the surface of the particle of the lithium-nickel composite oxide can be reduced to 0.10% by weight or less based on the whole of the particles. When the lithium-nickel composite oxide thus washed is used as a positive electrode active material, it can be inhibited that gas is generated during maintaining to a high temperature. Therefore, both a high capacity and a high output, and high safety can be achieved at the same time.

To the contrary, when the temperature at washing with water is lower than 10° C., there are possibilities that the lithium-nickel composite oxide cannot be sufficiently washed, and that an impurity adhered to the surface of the particle of the lithium-nickel composite oxide is not sufficiently removed from the surface, and the impurity remains on the surface in a large amount. When the impurity is remaining on the surface of the particle of the lithium-nickel composite oxide, since electric resistance of the surface of the particle of the lithium-nickel composite oxide increases, electric resistance of a positive electrode increases in the case where the lithium-nickel composite oxide is used as a positive electrode active material of a battery. Furthermore, there is a possibility that the specific surface area of the particle of the lithium-nickel composite oxide is excessively lowered. When the specific surface area is excessively lowered, the reactivity between the particle and an electrolyte solution decreases. When the lithium-nickel composite oxide thus obtained is used as a positive electrode active material of a battery, it becomes difficult to achieve a high capacity and a high output. Moreover, there is a possibility that this impurity contains lithium carbonate and lithium hydroxide. In this case, the content of lithium existing on the surface of the particle of the lithium-nickel composite oxide exceeds 0.10% by weight, and gas is apt to be generated during storing at a high temperature.

On the other hand, when the temperature at washing with water exceeds 40° C., the amount of lithium eluted from the particle of the lithium-nickel composite oxide increases, and there is a possibility that nickel oxide (NiO) in which Li is removed from its surface or nickel oxyhydroxide (NiOOH) in which Li is substituted with H is generated. Since nickel oxide (NiO) and nickel oxyhydroxide (NiOOH) have a high electric resistance, respectively, an electric resistance of the surface of the particle of the lithium-nickel composite oxide increases, and the content of Li in the particle of the lithium-nickel composite oxide decreases to cause lowering in capacity.

Accordingly, when the particle of the lithium-nickel composite oxide is used as a positive electrode active material, in order to achieve a high capacity, a high output and high safety at the same time, change of water temperature due to the change of the seasons is suppressed, and the temperature at washing with water in the process for washing with water is controlled so as to be preferably 10 to 40° C., more preferably 10 to 30° C.

(Period of Time for Washing with Water)

The period of time for washing the calcined powder of the lithium-nickel composite oxide with water is not particularly limited, and it is desired that the period of time is to 10 to 60 minutes or so. When the period of time for washing with water is too short, an impurity and a lithium compound existing on the surface of the calcined powder cannot be sufficiently removed from the surface, and remains on the surface. On the other hand, when the period of time for washing with water is too long, washing effect is not so improved, and productivity is lowered.

(Water for Forming Slurry)

There is no particular limitation in water which is used for forming slurry. However, in order to prevent battery performance from lowering due to the adhesion of an impurity to a positive electrode active material, water having an electrical conductivity of less than 10 µS/cm is preferable, and water having an electrical conductivity of 1 µS/cm or less is more preferable.

(Drying Temperature)

A temperature and a method for drying the calcined powder of the lithium-nickel composite oxide after washing with water are not particularly limited. The drying temperature is preferably 80 to 500° C., more preferably 120 to 250° C.

The reason why the drying temperature is controlled to 80° C. or higher is that the calcined powder of the lithium-nickel composite oxide after washing with water is dried promptly in order to prevent the generation of a gradient of the concentration of lithium between the surface and the interior of the calcined particle of the lithium-nickel composite oxide.

On the other hand, it is supposed that the surface of the calcined powder of the lithium-nickel composite oxide after washing with water is under the condition such that the ratio of lithium to the metals other than lithium is an approximately stoichiometric ratio or that the surface is almost fully electrically charged due to the desorption of lithium in a little amount. Therefore, when the drying temperature exceeds 500° C., there is a possibility such that electrical characteristics are lowered due to the distortion of the crystal structure of the powder under the condition being almost fully electrically charged.

Accordingly, in order to eliminate anxiety about physical properties and characteristics of the calcined powder of the lithium-nickel composite oxide after washing with water, it is desired that the drying temperature is 80 to 500° C., and in consideration of productivity and cost for thermal energy, it is more desired that the drying temperature is 120 to 250° C.

Incidentally, it is preferred that a process for drying the calcined powder of the lithium-nickel composite oxide is carried out by drying the powder after filtration at a predetermined temperature with a dryer which enables to control the atmosphere in the dryer to an atmosphere not containing a compound having carbon and a compound having sulfur, or a reduced pressure atmosphere. In this case, since the moisture content in the lithium-nickel composite oxide can be sufficiently reduced, there is an advantage such that generation of gas derived from the moisture can be inhibited when the lithium-nickel composite oxide is used as a positive electrode active material for a non-aqueous electrolyte secondary battery.

(Content of Moisture in Powder after Drying)

The content of moisture in the calcined powder of the lithium-nickel composite oxide after drying is not particularly limited, and the content is preferably 0.2% by weight or lower, more preferably 0.1% by weight or lower. When the content of moisture in the powder exceeds 0.2% by weight, there is a possibility that a lithium compound is generated on the surface of the powder by absorbing gas containing carbon or sulfur included in the air.

Incidentally, the above-mentioned content of moisture is a value as determined by using a Karl Fischer moisture meter at a vaporization temperature of 300° C.

(The Others)

In the above-mentioned embodiments, as a process for obtaining a calcined powder of a lithium-nickel composite oxide prior to washing with water, there has been described a process in which a nickel compound which is prepared by dissolving or dispersing a metal element other than lithium by means of a crystallization method is mixed with a lithium compound as raw materials, and the resulting mixture is calcined. However, the process for obtaining a calcined powder of a lithium-nickel composite oxide is not particularly limited. As the process, there can be cited, for example, a process for carrying out a spray-thermal decomposition of a solution prepared by mixing all of aqueous solutions containing desired metal elements, and a process for pulverizing and mixing all of compounds containing desired metal elements by means of a mechanical pulverizer such as a ball mill, and thereafter calcining the resulting mixture. It is preferred to use a lithium-nickel composite oxide prepared by the above-mentioned process from the viewpoint of preparation of a lithium-nickel composite oxide having a small specific surface area after washing with water and excellent thermal stability.

(Non-Aqueous Electrolyte Secondary Battery)

The non-aqueous electrolyte secondary battery of the present invention is produced by using a positive electrode which is produced by using a positive electrode active material including the above-mentioned lithium-nickel composite oxide, particularly a positive electrode active material including a lithium-nickel composite oxide which is prepared by the above-mentioned process. Since the positive electrode is used in the non-aqueous electrolyte secondary battery of the present invention, the non-aqueous electrolyte secondary battery has a high capacity, a high output and high safety.

The structure of the non-aqueous electrolyte secondary battery of the present invention is explained below.

The non-aqueous electrolyte secondary battery of the present invention (hereinafter simply referred to as secondary battery of the present invention) has substantially the same structure as a standard non-aqueous electrolyte secondary battery, except that the positive electrode active material for a non-aqueous electrolyte secondary battery of the present invention (hereinafter simply referred to as positive electrode active material of the present invention) is used as a material of a positive electrode.

More specifically, the secondary battery of the present invention has a structure containing a case, and a positive electrode, a negative electrode, a non-aqueous electrolyte solution and a separator, which are accommodated in the case. Furthermore specifically, the secondary battery of the present invention is formed by laminating a positive electrode and a negative electrode through a separator to give an electrode body, immersing the obtained electrode body in a non-aqueous electrolyte solution, connecting a positive electrode current collector of a positive electrode and a negative electrode current collector of a negative electrode with a positive terminal for leading to outside and a negative terminal for leading to outside, respectively, through a lead for connecting an electrode with a terminal, accommodating them in a case, and sealing the case.

In addition, the structure of the secondary battery of the present invention is not limited only to the above-mentioned exemplified oneta and various kinds of outer shapes such as a cylindrical shape and a laminated shape can be employed.

(Positive Electrode)

The positive electrode which is one of the characteristics of the secondary battery of the present invention is firstly described.

The positive electrode is a sheet-like material. The positive electrode can be formed by, for example, coating a positive electrode mixture containing the positive electrode active material of the present invention on the surface of a current collector made of an aluminum foil, and drying the positive electrode mixture. However, the process for producing the positive electrode is not particularly limited. The positive electrode can be also produced by, for example, supporting a positive electrode mixture containing particles of a positive electrode active material and a binder on a belt-like positive electrode core member (positive electrode current collector).

In addition, the positive electrode is appropriately treated so as to fit a battery to be used. For example, there can be conducted to the positive electrode a treatment such as a treatment for cutting so as to have a suitable size corresponding to an objective battery, or a treatment for compressing by means of a roll press and the like in order to increase an electrode density.

(Positive Electrode Mixture)

The positive electrode mixture can be prepared by mixing the positive electrode active material of the present invention in the form of powder with an electric conductive material and a binder to give a positive electrode agent, adding a solvent to the positive electrode agent, and kneading the resulting mixture.

Hereinafter, materials other than the positive electrode active material, which are used in the positive electrode mixture, are described.

(Binder)

As a binder which is used in the above-mentioned positive electrode mixture, any of a thermoplastic resin and a thermosetting resin can be used, and the thermoplastic resin is preferred. The above-mentioned thermoplastic resin includes, for example, polyethylene, polypropylene, polytetrafluoroethylene (PTFE), polyvinylidene fluoride (PVDF), styrene-butadiene rubber, tetrafluoroethylene-hexafluoropropylene copolymer (FEP), tetrafluoroethylene-perfluoroalkyl vinyl ether copolymer (PFA), vinylidene fluoride-hexafluoropropylene copolymer, vinylidene fluoride-chlorotrifluoroethylene copolymer, ethylene-tetrafluoroethylene copolymer (ETFE), polychlorotrifluoroethylene (PCTFE), vinylidene fluoride-pentafluoropropylene copolymer, propylene-tetrafluoroethylene copolymer, ethylene-chlorotrifluoroethylene copolymer (ECTFE), vinylidene fluoride-hexafluoropropylene-tetrafluoroethylene copolymer, vinylidene fluoride-perfluoromethylvinyl ether-tetrafluoroethylene copolymer, ethylene-acrylic acid copolymer, ethylene-methacrylic acid copolymer, ethylene-methyl acrylate copolymer, ethylene-methyl methacrylate copolymer, and the like. These resins can be used alone, or at least two kinds thereof can be used in combination. In addition, each of these resins can be a crosslinked resin being crosslinked by $Na^+$ ion and the like.

(Electric Conductive Material)

The electric conductive material used in the positive electrode mixture can be an electric conductive material which is chemically stable in a battery, and the electric conductive material is not particularly limited. The electric conductive material includes, for example, graphite such as natural graphite (flake graphite and the like) or artificial graphite; carbon black such as acetylene black, Ketjen black, channel black, furnace black, lamp black or thermal black; electric conductive fibers such as carbon fiber and metal fiber; metal powder such as aluminum powder; electric conductive whisker such as zinc oxide whisker or potassium titanate whisker; electric conductive metal oxide such as titanium oxide; organic electric conductive materials such as polyphenylene derivatives; fluorocarbon, and the like. These electric conductive materials can be used alone, or at least two kinds thereof can be used in combination.

Incidentally, the amount of the electric conductive material which is added to the positive electrode mixture is not particularly limited, and the amount is preferably 0.5 to 50% by weight, more preferably 0.5 to 30% by weight, furthermore preferably 0.5 to 15% by weight to the powder of a positive-electrode active material contained in the positive electrode mixture.

(Solvent)

A solvent is used to dissolve a binder and to disperse a positive electrode active material, an electric conductive material and the like in the binder. This solvent is not particularly limited, and there can be used, for example, an organic solvent such as N-methyl-2-pyrrolidone.

(Positive Electrode Core Material)

A positive electrode core material (positive electrode collector) can be an electronic conductor which is chemically stable in a battery, and is not particularly limited. The positive electrode core material includes, for example, a foil and a sheet made of a material such as aluminum, stainless steel, nickel, titanium, carbon or an electric conductive resin. Among them, an aluminum foil, an aluminum alloy foil and the like are preferred. Moreover, a carbon layer or a titanium layer can be formed on the surface of a foil or a sheet, and an oxide layer can be formed on the surface of a foil or a sheet. Furthermore, a convex and concave form can be formed on the surface of a foil or a sheet. In addition, a net, a punching sheet, a lath, a porous material, a foamed material, a fibrous molded article and the like also can be provided on the surface of a foil or a sheet.

The thickness of the positive electrode core material is not particularly limited, and it is preferred that the thickness is, for example, 1 to 500 μm.

(Materials Other than Positive Electrode)

Next, the materials other than a positive electrode, which are used in the non-aqueous electrolyte secondary battery of the present invention, are described.

Incidentally, the non-aqueous electrolyte secondary battery of the present invention is characterized in that the above-mentioned positive electrode active material is used. The materials other than the positive electrode can be suitably selected according to the use and required characteristics, and are not limited to the materials other than the positive electrode as described below.

(Negative Electrode)

A negative electrode can be one which enables to charge and discharge lithium, and the negative electrode is not particularly limited. As the negative electrode, there can be used a negative electrode in which a negative electrode mixture containing a negative electrode active material and a binder, and an electric conductive material and a thickener as optional components, is supported on a negative electrode core material. The negative electrode can be produced in the same manner as in the positive electrode.

The negative electrode active material can be one which enables to electrochemically charge and discharge lithium. The negative electrode active material includes, for example, graphite, nongraphitizing carbon, lithium alloy, and the like. The lithium alloy is not particularly limited, and it is preferred that the lithium alloy contains at least one element selected from the group consisting of silicon, tin, aluminum, zinc and magnesium.

In addition, the mean particle diameter of the negative electrode active material is not particularly limited, and it is preferred that the mean particle diameter is, for example, 1 to 30 μm.

(Binder)

A binder used in the negative electrode mixture can be any of a thermoplastic resin and a thermosetting resin. Among the resins, thermoplastic resin is preferred. The thermoplastic resin is not particularly limited. The thermoplastic resin includes, for example, polyethylene, polypropylene, polytetrafluoroethylene (PTFE), polyvinylidene fluoride (PVDF), styrene-butadiene rubber, tetrafluoroethylene-hexafluoropropylene copolymer (FEP), tetrafluoroethylene-perfluoroalkyl vinyl ether copolymer (PFA), vinylidene fluoride-hexafluoropropylene copolymer, vinylidene fluoride-chlorotrifluoroethylene copolymer, ethylene-tetrafluoroethylene copolymer (ETFE), polychlorotrifluoroethylene (PCTFE), vinylidene fluoride-pentafluoropropylene copolymer, propylene-tetrafluoroethylene copolymer, ethylene-chlorotrifluoroethylene copolymer (ECTFE), vinylidene fluoride-hexafluoropropylene-tetrafluoroethylene copolymer, vinylidene fluoride-perfluoromethyl vinyl ether-tetrafluoroethylene copolymer, ethylene-acrylic acid copolymer, ethylene-methacrylic acid copolymer, ethylene-methyl acrylate copolymer, ethylene-methyl methacrylate copolymer, and the like. These resins can be used alone, or at least two kinds thereof can be used in combination. In addition, each of these resins can be a crosslinked resin being crosslinked by Nat ion and the like.

(Electric Conductive Material)

The electric conductive material of a negative electrode mixture can be an electric conductive material which is chemically stable in a battery, and the electric conductive material is not particularly limited. The electric conductive material includes, for example, graphite such as natural graphite (flake graphite and the like) or artificial graphite; carbon black such as acetylene black, Ketjen black, channel black, furnace black, lamp black or thermal black; electric conductive fibers such as a carbon fiber and a metal fiber; metal powder such as copper powder or nickel powder; organic electric conductive materials such as polyphenylene derivatives, and the like. These electric conductive materials can be used alone, or at least two kinds thereof can be used in combination.

The amount of this electric conductive material to be added is not particularly limited. The amount of the electric conductive material is preferably 1 to 30% by weight, more preferably 1 to 10% by weight to the particles of a negative electrode active material contained in the negative electrode material mixture.

(Negative Electrode Core Material)

A negative electrode core material (negative electrode collector) can be an electronic conductor which is chemically stable in a battery, and is not particularly limited. The negative electrode core material includes, for example, a foil and a sheet made of a material such as stainless steel, nickel, copper, titanium, carbon or an electric conductive resin. Among them, copper and copper alloy are preferred. A layer such as a carbon layer, a titanium layer or a nickel layer can be formed on the surface of a foil or a sheet, and an oxide layer can be formed on the surface of a foil or a sheet. Moreover, a convex and concave form can be formed on the surface of a foil or a sheet. Furthermore, a net, a punching sheet, a lath, a porous material, a foamed material, a fibrous molded article and the like can be provided on the surface of a foil or a sheet.

The thickness of the negative electrode core material is also not particularly limited, and it is preferred that the thickness is, for example, 1 to 500 µm.

(Non-Aqueous Electrolyte Solution)

It is preferred that the non-aqueous electrolyte solution is a solution in which a lithium salt is dissolved in a non-aqueous solvent. The non-aqueous solvent used in the non-aqueous electrolyte solution is not particularly limited. The non-aqueous solvent includes, for example, cyclic carbonates such as ethylene carbonate (EC), propylene carbonate (PC), butylene carbonate (BC) and vinylene carbonate (VC); chain carbonates such as dimethyl carbonate (DMC), diethyl carbonate (DEC), ethylmethyl carbonate (EMC) and dipropyl carbonate (DPC); aliphatic carboxylates such as methyl formate, methyl acetate, methyl propionate and ethyl propionate; lactones such as gamma-butyrolactone and gamma-valerolactone; chain ethers such as 1,2-dimethoxyethane (DME), 1,2-diethoxyethane (DEE) and ethoxymethoxy ethane (EME); cyclic ethers such as tetrahydrofuran and 2-methyltetrahydrofuran; dimethyl sulfoxide, 1,3-dioxolane, formamide, acetamide, dimethylformamide, dioxolane, acetonitrile, propyl nitrile, nitromethane, ethyl monoglyme, phosphoric acid triester, trimethoxymethane, dioxolane derivatives, sulfolane, methyl sulfolane, 1,3-dimethyl-2-imidazolidinone, 3-methyl-2-oxazolidinone, propylene carbonate derivatives, tetrahydrofuran derivatives, ethyl ethers, 1,3-propanesultone, anisole, dimethyl sulfoxide, N-methyl-2-pyrrolidone, and the like. These solvents can be used alone, or at least two kinds thereof can be used in combination.

Among them, a mixed solvent of a cyclic carbonate and a chain carbonate, and a mixed solvent of a cyclic carbonate, a chain carbonate and an aliphatic carboxylate are particularly preferred.

(Lithium Salt)

The lithium salt being dissolved in a non-aqueous electrolyte solution includes, for example, $LiClO_4$, $LiBF_4$, $LiPF_6$, $LiAlCl_4$, $LiSbF_6$, $LiSCN$, $LiCl$, $LiCF_3SO_3$, $LiCF_3CO_2$, $Li(CF_3SO_2)_2$, $LiAsF_6$, $LiN(CF_3SO_2)_2$, $LiB_{10}Cl_{10}$, lithium lower aliphatic carboxylate, LiCl, LiBr, LiI, chloroborane lithium, lithium tetraphenylborate, lithium imide, and the like. These lithium salts can be used alone, or at least two kinds thereof can be used in combination. Incidentally, it is preferred that at least $LiPF_6$ is used as the lithium salt.

In addition, the concentration of lithium salt in the non-aqueous solvent is not particularly limited, and it is preferred that the concentration is 0.2 to 2 mol/L, more preferably 0.5 to 1.5 mol/L.

(Other Additive)

To the non-aqueous electrolyte solution, various additives other than the lithium salt can be added in order to improve charge-discharge characteristics of a battery. The additive is not particularly limited. The additive includes, for example, triethyl phosphite, triethanolamine, cyclic ethers, ethylenediamine, n-glyme, pyridine, hexaphosphoric acid triamide, nitrobenzene derivatives, crown ethers, quaternary ammonium salts, ethylene glycol dialkyl ethers, and the like.

(Separator)

A fine separator is intervened between a positive electrode and a negative electrode. This separator is not particularly limited, and it is preferred that the separator is a microporous thin film having a high ion permeability, a predetermined mechanical strength and an electric insulation. In particular, it is preferred that the microporous thin film has properties such that holes of the thin film are closed at a predetermined temperature, and that the thin film has a function for increasing an electric resistance.

The material used in the microporous thin film is not particularly limited, and there can be used, for example, a polyolefin which is excellent in organic solvent resistance and has hydrophobicity, such as polypropylene or polyethylene. In addition, a sheet made of a glass fiber and the like, non-woven fabric, woven fabric and the like can be also used.

When the separator is a microporous thin film, the diameter of a pore formed in the thin film is not particularly limited, and it preferred that the diameter of the pore is, for example, 0.01 to 1 µm. The porosity of the separator is not also particularly limited, and it is preferred that the porosity is generally 30 to 80%. Moreover, the thickness of the separator is not also particularly limited, and it is preferred that the thickness is generally 10 to 300 µm.

Furthermore, the separators used in the positive electrode and the negative electrode can be different from each other. The polymer electrolyte which includes a non-aqueous electrolyte solution and a polymer substrate for retaining the non-aqueous electrolyte solution can be used as a separator by unifying into one body with a positive electrode or a negative electrode. This polymer substrate is not particularly limited, as long as the polymer substrate can retain a non-aqueous electrolyte solution. It is preferred that the polymer used in the polymer substrate is a copolymer of vinylidene fluoride and hexafluoropropylene.

EXAMPLES

The present invention is more specifically described by the following working examples of the present invention and comparative examples, but the present invention is not limited only to those working examples.

Incidentally, in the working examples and the comparative examples, in accordance with the following methods, metals included in a lithium-nickel composite oxide were analyzed, and the length of c-axis was measured.

(1) Analysis of metals: determined by ICP emission spectrometry.

(2) Measurement of length of c-axis: measured by using a XRD diffractometer manufactured by PANalytical B. V. under the item number of X'Pert PRO.

(3) Identification of a particle structure and determination of porosity:

A positive electrode active material was embedded in a resin, and cross section polisher processing of the resin was carried out so that the cross section of a particle of the positive electrode active material could be observed. The cross section was observed with a scanning electron microscope manufactured by Hitachi high technologies under the item number of S-4700 at a magnification of 5000 times. The obtained image was processed by using an image analysis soft of WinROOF Ver. 6.1.1, and 20 particles or more were arbitrary selected. The vacant area in the secondary particles was colored black to form a black part, and the compact area within the periphery of the secondary particles was colored to white to form a white part. The total area of the black part and the white part was measured, and the area ratio of [area of black part/(area of black part+area of white part)] was calculated to determine porosity.

(4) Specific surface area: determined by using a specific surface area measuring apparatus commercially available from Yuasa Ionics Inc. under the trade name of Multisorb 16 in accordance with a single point BET method using adsorption of nitrogen.

(5) Evaluation of battery characteristics:

(Process for Producing Secondary Battery for Evaluating Battery Performance)

When battery performance of a non-aqueous electrolyte secondary battery, in which a lithium-nickel composite oxide according to the present invention was used as a positive electrode active material, was evaluated, a 2032 coin type battery as shown in FIG. 1 (hereinafter referred to as coin type battery 1) was used.

As shown in FIG. 1, the coin type battery 1 is composed of a case 2 and an electrode 3 which is accommodated in the case 2.

The case 2 has a positive electrode can 2a which is hollow and has an opening at one end, and a negative electrode can 2b which is arranged at the opening of the positive electrode can 2a. When the negative electrode can 2b is placed on the opening of the positive electrode can 2a, a space for accommodating an electrode 3 is formed between the negative electrode can 2b and the positive electrode can 2a.

The electrode 3 includes a positive electrode (electrode for evaluation) 3a, a separator 3c and a negative electrode (lithium metal negative electrode) 3b, and these constituents are laminated in this order. The positive electrode 3a and the negative electrode 3b are accommodated in the case 2 so that the positive electrode 3a is contacted with the inner surface of the positive electrode can 2a, and that the negative electrode 3b is contacted with the inner surface of the negative electrode can 2b.

Incidentally, the case 2 is equipped with a gasket 2c. The positive electrode can 2a and the negative electrode 2b are maintained so that the positive electrode can 2a is not contacted with the negative electrode 2b through the gasket 2c, and that a relative movement of the positive electrode can 2a and the negative electrode 2b are fixed by the gasket 2c. Also, since the gasket 2c seals the space between the positive electrode can 2a and the negative electrode 2b, the gasket 2c has a function for airtightly and liquid-tightly blocking the space between the inside of the case 2 and its outside.

The above-mentioned coin type battery 1 was produced by the following methods:

At first, 5 parts by weight of acetylene black and 5 parts by weight of polyvinylidene fluoride were mixed with 90 parts by weight of a powder of a positive electrode active material, and n-methyl pyrrolidone is added to the resulting mixture, to give a paste. An aluminum foil having a thickness of 20 μm was coated with this paste, so that the amount of the positive electrode active material after drying was 0.05 g/cm².

Thereafter, the aluminum foil which was coated with the paste was dried at 120° C. under reduced pressure, and then the aluminum foil was punched into a disc having a diameter of 1 cm, to give a positive electrode 3a.

The above-mentioned coin type battery 1 was produced by using this positive electrode 3a, the negative electrode 3b, the separator 3c and an electrolyte solution in a glove box having argon gas atmosphere of which dew point was controlled to −80° C.

Incidentally, as the negative electrode 3b, a discoidal plate made of lithium metal having a diameter of 15 mm was used.

As the separator 3c, a porous polyethylene film having a thickness of 20 μm was used.

As the electrolyte solution, a mixed solution of ethylene carbonate (EC) and diethyl carbonate (DEC) being mixed in an equal ratio, containing 1 M of $LiClO_4$ as a supporting electrolyte (manufactured by Ube Industries, Ltd.) was used.

The battery characteristics of the coin type battery produced by the above-mentioned method were evaluated. As the battery characteristics, initial electric discharge capacity and positive electrode reaction resistance were determined.

The initial discharge capacity was determined by the following method:

At first, a coin type battery 1 was produced, and the coin type battery 1 was allowed to stand for about 24 hours. After the open circuit voltage OCV (Open Circuit Voltage) of the coin type battery 1 was stabilized, the positive electrode of the coin type battery 1 was charged up to a cutoff voltage of 4.3 V at a current density of 0.1 mA/cm². After 1 hour pauses, the coin type battery 1 was discharged to a cutoff voltage of 3.0 V. The coin type battery 1 was discharged to a cutoff voltage of 3.0 V, and the capacity of the coin type battery 1 at this point was regarded as an initial discharge capacity.

The positive electrode reaction resistance was calculated by the following method:

First of all, the coin type battery was charged to a charging voltage of 4.1 V. An AC impedance of the coin type battery was determined by an AC impedance method with a frequency response analyzer and a potentiogalvanostat (manufactured by Solartron ISA under the item number of 1255B). As a result, a Nyquist plot was obtained as shown in FIG. 2. This Nyquist plot showed a sum of characteristic curves indicating a solution resistance, a negative electrode resistance and its capacity, and electric resistance of a positive electrode and its capacity. Therefore, a fitting calculation was carried out by using an equivalent circuit based on the Nyquist plot, to obtain a value of the positive electrode reaction resistance. Incidentally, as the electric resistance of a positive electrode, a relative value when the electric resistance of a positive electrode obtained in Example 1 was regarded as 1.00 was used.

Example 1

First of all, a known crystallization method was used. While maintaining a pH of the reaction solution to 13.0 at a liquid temperature of 25° C. with 20% by weight aqueous solution of sodium hydroxide, a mixed aqueous solution of nickel sulfate and cobalt sulfate, an aqueous solution of sodium aluminate and 25% aqueous ammonia were added to the reaction solution, and the resulting solution was collected by overflowing. The collected solution was washed with 45 g/L aqueous solution of sodium hydroxide having a pH of 12.5 at a liquid temperature of 25° C., then washed with water, and dried, to give a nickel composite hydroxide (neutralizing crystallization method).

This nickel composite hydroxide was composed of spherical secondary particles which were formed by the aggregation of plural primary particles having a diameter of 1 μm or less. When the nickel composite hydroxide was analyzed by an ICP method, it was confirmed that the nickel composite hydroxide was a nickel composite hydroxide in which the molar ratio of Ni:Co:Al was 85:12:3.

The mean particle diameter on the basis of volume (MV) of this nickel composite hydroxide was 15 μm as determined by a laser diffraction scattering method. In addition, the quantitative analysis of sulfur was carried out by an ICP emission spectrometry, and the content of sulfate radical was determined by regarding that sulfur is completely oxidized to sulfate radical ($SO_4$). As a result, the content of the sulfate radical was 0.28% by weight. The content of the sulfate radical in the nickel composite hydroxide is shown in Table 1.

This nickel composite hydroxide was oxidized and calcined at 600° C. in the air, to give nickel composite oxide. Thereafter, the nickel composite hydroxide and lithium hydroxide monohydrate (manufactured by Wako Pure Chemical Industries, Ltd.) were weighed, and the nickel composite hydroxide was mixed with the lithium hydroxide monohydrate so that the molar ratio of Ni:Co:Al:Li was 0.85:0.12:0.03:1.03, to give a lithium-containing mixture.

The resulting lithium-containing mixture was provisionally calcined at 500° C. for 3 hours in an oxygen-containing atmosphere by using an electric furnace, then the mixture was maintained at 750° C. for 3 hours, and calcining was carried out by controlling the period of time from the initiation of increasing the temperature to the end of maintaining the temperature to 20 hours. Thereafter, the mixture was cooled to room temperature in the electric furnace, and pulverized to give a spherical calcined powder made by the aggregation of primary particles.

To the obtained calcined powders, purified water having a temperature of 20° C. was added, to form slurry containing the calcined powder in an amount of 1000 g per 1 liter the purified water. This slurry was stirred for 50 minutes for washing with water.

Thereafter, powder was collected by filtering the slurry, and the powder was allowed to stand for 10 hours in a vacuum drier which was heated to 150° C., to give a lithium-nickel composite oxide. The mean particle diameter MV of the resulting lithium-nickel composite oxide was 15 μm, which was substantially the same as that of the raw material, the nickel composite hydroxide.

The formulation of the obtained lithium-nickel composite oxide was analyzed, and the length of c-axis of the lithium-nickel composite oxide was determined. The occupancy of lithium (Li) at 3a site was 98.8% as determined by a Rietveld analysis of X-ray diffraction, and the occupancy of metals other than lithium at 3b site was 99.3% as determined by the Rietveld analysis.

In addition, a coin type battery was produced by using the powder of the lithium-nickel composite oxide obtained above in accordance with the method as mentioned above. The initial discharge capacity and the positive electrode reaction resistance of the produced coin type battery were determined.

The results are shown in Table 2.

Example 2

A positive electrode active material was prepared and evaluated in the same manner as in Example 1, except that crystallization of a nickel composite hydroxide was carried out so that the molar ratio of nickel, cobalt and aluminum was 90:7:3, to give a nickel composite hydroxide.

The results are shown in Table 1 and Table 2, respectively.

Example 3

A positive electrode active material was prepared and evaluated in the same manner as in Example 1, except that crystallization of a nickel composite hydroxide was carried out so that the molar ratio of nickel, cobalt and aluminum was 94:3:3, to give a nickel composite hydroxide.

The results are shown in Table 1 and Table 2, respectively.

Example 4

A positive electrode active material was prepared and evaluated in the same manner as in Example 1, except that crystallization of a nickel composite hydroxide was carried out so that the molar ratio of nickel, cobalt and aluminum was 90:7:3, to give a nickel composite hydroxide, and that 10 g/L aqueous sodium hydroxide solution having a pH of 11.0 at a liquid temperature of 25° C. was used in washing the nickel composite hydroxide after its collection by overflowing.

The results are shown in Table 1 and Table 2, respectively.

Example 5

A positive electrode active material was prepared and evaluated in the same manner as in Example 1, except that crystallization of a nickel composite hydroxide was carried out so that the molar ratio of nickel, cobalt and aluminum was 90:7:3, to give a nickel composite hydroxide, and that the nickel composite hydroxide after its collection by overflowing was washed with water only one time.

The results are shown in Table 1 and Table 2, respectively.

Comparative Example 1

A positive electrode active material was prepared and evaluated in the same manner as in Example 1, except that crystallization of a nickel composite hydroxide was carried out so that the molar ratio of nickel, cobalt and aluminum was 82:15:3, to give a nickel composite hydroxide.

The results are shown in Table 1 and Table 2, respectively.

Comparative Example 2

A positive electrode active material was prepared and evaluated in the same manner as in Example 1, except that crystallization of a nickel composite hydroxide was carried out so that the molar ratio of nickel, cobalt and aluminum was 90:7:3, to give a nickel composite hydroxide, and that 65 g/L aqueous sodium hydroxide solution having a pH of 13.5 at a liquid temperature of 25° C. was used in washing the nickel composite hydroxide after its collection by overflowing.

The results are shown in Table 1 and Table 2, respectively.

(Evaluation)

In Examples 1 to 5, the lithium-nickel composite oxides were prepared by the process according to the present invention. Therefore, as shown in Table 1, it can be confirmed that the length of c-axis can be controlled to 14.185 angstrom or more, and that high battery capacity and low electric resistance of a positive electrode (high output characteristics) are achieved. In particular, in Examples 1 to 4, it can be confirmed that crystallization is sufficiently progressed, and that higher battery capacity and lower electric resistance of a positive electrode (high output characteristics) are achieved, since the porosity is within a range of 0.5 to 4%.

On the other hand, in Comparative Example 1, since the content of nickel is lower, and the length of c-axis is less than 14.185 angstrom, its battery capacity is lower than that of each Example, and electric resistance of a positive electrode is higher than that of each Example.

As to Comparative Example 2, since the content of the sulfate radical in the nickel hydroxide was lower, and crystallization is excessively preceded, the length of c-axis is less than 14.185 angstrom, its porosity is higher than that of each Example, its battery capacity is lower than that of each Example, and its electric resistance of a positive electrode is higher than that of each Example.

From the results as mentioned above, when a lithium-nickel composite oxide is prepared by the process according to the present invention, and a non-aqueous electrolyte secondary battery is produced by using this lithium-nickel composite oxide as a positive electrode active material, it can be confirmed that a battery having high initial discharge capacity can be produced.

TABLE 1

|  | Washing with alkali (pH) | Content of sulfate radical (wt %) | Temperature at calcining (° C.) | Conditions for washing with water | |
|---|---|---|---|---|---|
|  |  |  |  | Temperature of water (° C.) | Concentration of slurry (g/L) |
| Example 1 | 12.5 | 0.28 | 750 | 20 | 1000 |
| Example 2 | 12.5 | 0.26 | 750 | 20 | 1000 |
| Example 3 | 12.5 | 0.28 | 750 | 20 | 1000 |
| Example 4 | 11.0 | 0.12 | 750 | 20 | 1000 |
| Example 5 | — | 0.84 | 750 | 20 | 1000 |
| Comp. Ex. 1 | 12.5 | 0.27 | 750 | 20 | 1000 |
| Comp. Ex. 2 | 13.5 | 0.08 | 750 | 20 | 1000 |

TABLE 2

|  | Composition (molar ratio of Ni:Co:Al) | Li/M | Mean particle diameter (μm) | Length of c-axis (Å) | Porosity (%) | Specific surface area (m²/g) | Discharge capacity (mAh/g) | Electric resistance of a positive electrode |
|---|---|---|---|---|---|---|---|---|
| Example 1 | 85:12:3 | 0.96 | 15 | 14.185 | 3.4 | 1.25 | 208 | 1.00 |
| Example 2 | 90:7:3 | 0.95 | 15 | 14.190 | 3.4 | 1.20 | 210 | 0.95 |
| Example 3 | 94:3:3 | 0.96 | 14 | 14.200 | 3.2 | 1.15 | 211 | 0.91 |
| Example 4 | 90:7:3 | 0.96 | 15 | 14.191 | 0.8 | 0.91 | 209 | 0.98 |
| Example 5 | 90:7:3 | 0.94 | 15 | 14.205 | 0.68 | 1.61 | 201 | 1.15 |
| Comp. Ex. 1 | 82:15:3 | 0.97 | 16 | 14.180 | 3.8 | 1.43 | 200 | 1.25 |
| Comp. Ex. 2 | 90:7:3 | 0.97 | 15 | 14.183 | 0.31 | 0.70 | 193 | 1.16 |

INDUSTRIAL APPLICABILITY

The non-aqueous electrolyte secondary battery of the present invention has a high capacity and high safety. Therefore, the non-aqueous electrolyte secondary battery of the present invention can be particularly suitably used as a secondary battery capable of charging and discharging, which can be used in small portable electronic equipments such as a notebook-sized personal computer and a mobile phone.

EXPLANATION OF REFERENTIAL NUMBERS

1 Coin type battery
2 Case
2a Positive electrode can
2b Negative electrode can
2c Gasket
3 Electrode
3a Positive electrode
3b Negative electrode
3c Separator

The invention claimed is:

1. A process for producing a positive electrode active material for a non-aqueous electrolyte secondary battery, comprising the following processes (A) and (B):
(A) mixing a nickel composite hydroxide comprising cobalt and at least one element selected from the group consisting of Al, Ti, Mn and W, a nickel composite oxyhydroxide comprising cobalt and at least one element selected from the group consisting of Al, Ti, Mn and W, or a nickel composite oxide comprising cobalt and at least one element selected from the group consisting of Al, Ti, Mn and W with a lithium compound, and thereafter calcining the resulting mixture in an oxygen-containing atmosphere at a temperature of 700 to 780° C. so that the length of c-axis of the lithium-nickel composite oxide is 14.185 angstrom or more, to give a calcined powder of a lithium-nickel composite oxide represented by the following general formula (2):

$$Li_aNi_{1-x-y}Co_xM_yO_2 \quad (2)$$

wherein M is at least one element selected from the group consisting of Al, Ti, Mn and W; a satisfies 0.98≤a≤1.11; x satisfies 0<x≤0.15; y satisfies 0<y≤0.07; and the sum of x and y satisfies x+y≤0.16, and
(B) mixing said calcined powder of the lithium-nickel composite oxide with water so that the amount of the calcined powder of the lithium-nickel composite oxide is 700 g to 2000 g per 1 liter of water to form a slurry, washing the calcined powder of the lithium-nickel composite oxide with water under the condition of maintaining a temperature of the slurry to 10 to 40° C., and thereafter filtering and drying the slurry, to give a lithium-nickel composite oxide powder.

2. The process for producing a positive electrode active material for a non-aqueous electrolyte secondary battery according to claim 1, wherein the nickel composite oxide is prepared by oxidizing and calcining at least one of the nickel composite hydroxide and the nickel composite oxyhydroxide at a temperature of 500 to 750° C.

3. The process for producing a positive electrode active material for a non-aqueous electrolyte secondary battery according to claim 1, wherein said nickel composite hydroxide is prepared by adding dropwise an aqueous solution comprising nickel sulfate and a metal compound comprising cobalt and at least one element selected from the group consisting of Al, Ti, Mn and W, and an aqueous solution comprising a compound for supplying ammonium ion to a reaction solution in a reaction vessel being heated, and wherein an aqueous solution of an alkali metal hydroxide is added dropwise to the reaction solution so that alkalinity of the reaction solution is maintained during the preparation of the nickel composite hydroxide.

4. The process for producing a positive electrode active material for a non-aqueous electrolyte secondary battery according to claim 3, wherein said nickel composite hydroxide is washed with an aqueous alkaline solution of which pH is controlled to 11 to 13 at a liquid temperature of 25° C.

5. The process for producing a positive electrode active material for a non-aqueous electrolyte secondary battery according to claim 1, wherein the nickel composite oxyhydroxide is prepared by adding an oxidizing agent to said nickel composite hydroxide.

6. The process for producing a positive electrode active material for a non-aqueous electrolyte secondary battery according to claim 1, wherein said lithium compound is at least one member selected from the group consisting of lithium hydroxide, lithium oxyhydroxide, lithium oxide, lithium carbonate, lithium nitrate and lithium halide.

7. The process for producing a positive electrode active material for a non-aqueous electrolyte secondary battery according to claim 1, wherein the nickel compound is mixed with the lithium compound so that a molar ratio of lithium contained in the lithium compound to all metal elements contained in the nickel composite oxide is 0.98 to 1.11 in the process (A).

8. The process for producing a positive electrode active material for a non-aqueous electrolyte secondary battery according to claim 1, wherein the temperature at washing with water in the process for washing with water is controlled to 10 to 40° C. in the process (B).

9. The process for producing a positive electrode active material for a non-aqueous electrolyte secondary battery according to claim 1, wherein the calcined powder after washing with water is dried in an atmosphere not containing a compound comprising carbon or in a reduced-pressure atmosphere in the process (B).

10. The process for producing a positive electrode active material for a non-aqueous electrolyte secondary battery according to claim 2, wherein said lithium compound is at least one member selected from the group consisting of lithium hydroxide, lithium oxyhydroxide, lithium oxide, lithium carbonate, lithium nitrate and lithium halide.

11. The process for producing a positive electrode active material for a non-aqueous electrolyte secondary battery according to claim 3, wherein said lithium compound is at least one member selected from the group consisting of lithium hydroxide, lithium oxyhydroxide, lithium oxide, lithium carbonate, lithium nitrate and lithium halide.

12. The process for producing a positive electrode active material for a non-aqueous electrolyte secondary battery according to claim 4, wherein said lithium compound is at least one member selected from the group consisting of lithium hydroxide, lithium oxyhydroxide, lithium oxide, lithium carbonate, lithium nitrate and lithium halide.

13. The process for producing a positive electrode active material for a non-aqueous electrolyte secondary battery according to claim 5, wherein said lithium compound is at least one member selected from the group consisting of lithium hydroxide, lithium oxyhydroxide, lithium oxide, lithium carbonate, lithium nitrate and lithium halide.

14. The process for producing a positive electrode active material for a non-aqueous electrolyte secondary battery according to claim 2, wherein the nickel compound is mixed with the lithium compound so that a molar ratio of lithium contained in the lithium compound to all metal elements contained in the nickel composite oxide is 0.98 to 1.11 in the process (A).

15. The process for producing a positive electrode active material for a non-aqueous electrolyte secondary battery according to claim 3, wherein the nickel compound is mixed with the lithium compound so that a molar ratio of lithium contained in the lithium compound to all metal elements contained in the nickel composite oxide is 0.98 to 1.11 in the process (A).

16. The process for producing a positive electrode active material for a non-aqueous electrolyte secondary battery according to claim 4, wherein the nickel compound is mixed with the lithium compound so that a molar ratio of lithium contained in the lithium compound to all metal elements contained in the nickel composite oxide is 0.98 to 1.11 in the process (A).

17. The process for producing a positive electrode active material for a non-aqueous electrolyte secondary battery according to claim 5, wherein the nickel compound is mixed with the lithium compound so that a molar ratio of lithium contained in the lithium compound to all metal elements contained in the nickel composite oxide is 0.98 to 1.11 in the process (A).

18. The process for producing a positive electrode active material for a non-aqueous electrolyte secondary battery according to claim 6, wherein the nickel compound is mixed with the lithium compound so that a molar ratio of lithium contained in the lithium compound to all metal elements contained in the nickel composite oxide is 0.98 to 1.11 in the process (A).

* * * * *